US011986986B2

(12) United States Patent
Shimada et al.

(10) Patent No.: US 11,986,986 B2
(45) Date of Patent: May 21, 2024

(54) INJECTION MOLDING SYSTEM AND SETTING SUPPORT METHOD FOR INJECTION MOLDING MACHINE

(71) Applicant: Hitachi, Ltd., Tokyo (JP)

(72) Inventors: Ryotaro Shimada, Tokyo (JP); Satoshi Arai, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 428 days.

(21) Appl. No.: 17/448,452

(22) Filed: Sep. 22, 2021

(65) Prior Publication Data

US 2022/0088844 A1  Mar. 24, 2022

(30) Foreign Application Priority Data

Sep. 23, 2020  (JP) ................................. 2020-158259

(51) Int. Cl.
  *B29C 45/76*  (2006.01)
(52) U.S. Cl.
  CPC .. *B29C 45/766* (2013.01); *B29C 2945/76929* (2013.01)
(58) Field of Classification Search
  CPC ........ B29C 2945/76929; B29C 45/766; B29C 2945/76949; B29C 45/76; H04N 19/124; H04N 19/13; H04N 19/174; H04N 19/33; H04N 19/426; H04N 19/44; H04N 19/46; H04N 19/59; H04N 19/625; H04N 19/70; H04N 19/86
  USPC ......................................................... 700/200
  See application file for complete search history.

(56) References Cited

U.S. PATENT DOCUMENTS

| | | | | |
|---|---|---|---|---|
| 7,465,416 B2* | 12/2008 | Nagaoka | ............. | B29C 33/3835 700/98 |
| 8,855,804 B2* | 10/2014 | Hazen | ................... | G05B 15/02 700/109 |
| 2008/0290541 A1* | 11/2008 | Baumann | ............ | B29C 45/2725 264/40.6 |
| 2013/0345855 A1* | 12/2013 | Tsai | ...................... | B29C 45/766 700/200 |
| 2020/0307053 A1* | 10/2020 | Shimada | ............... | B29C 45/766 |
| 2021/0370568 A1* | 12/2021 | Shimada | ................. | B29C 45/77 |

FOREIGN PATENT DOCUMENTS

| | | |
|---|---|---|
| DE | 10 2013 016 914 A1 | 5/2014 |
| DE | 10 2020 107 463 A1 | 10/2020 |
| EP | 1 422 042 A1 | 5/2004 |

(Continued)

OTHER PUBLICATIONS

Japanese-language Office Action issued in Japanese Application No. 2020-158259 dated Dec. 26, 2023 with English translation (3 pages).

(Continued)

*Primary Examiner* — Chun Cao

(74) *Attorney, Agent, or Firm* — Crowell & Moring LLP

(57) ABSTRACT

Provided is an injection molding system capable of improving usability for a user. The injection molding system determines a combination of a mold and an injection molding machine and a specific molding condition specific to the combination of the mold and the injection molding machine, and outputs the determined specific molding condition in a predetermined form for manual input to the injection molding machine.

11 Claims, 14 Drawing Sheets

(56) References Cited

FOREIGN PATENT DOCUMENTS

| | | |
|---|---|---|
| JP | 5-169507 A | 7/1993 |
| JP | 6-210691 A | 8/1994 |
| JP | 9-272145 A | 10/1997 |
| JP | 2001-71362 A | 3/2001 |
| JP | 2002-307512 A | 10/2002 |
| JP | 5709328 B2 | 4/2015 |

OTHER PUBLICATIONS

German-language Office Action issued in German Application No. 10 2021 209 411.2 dated Jul. 25, 2023 with English translation (12 pages).
Grimm et al., "Flight Simulator for Injection Molding Machines", Kunststoffe, Apr. 2011, pp. 39-44, with English translation (11 pages).
Chinese-language Office Action issued in Chinese Application No. 202110779520.7 dated Jun. 29, 2023 with partial English translation (13 pages).

\* cited by examiner

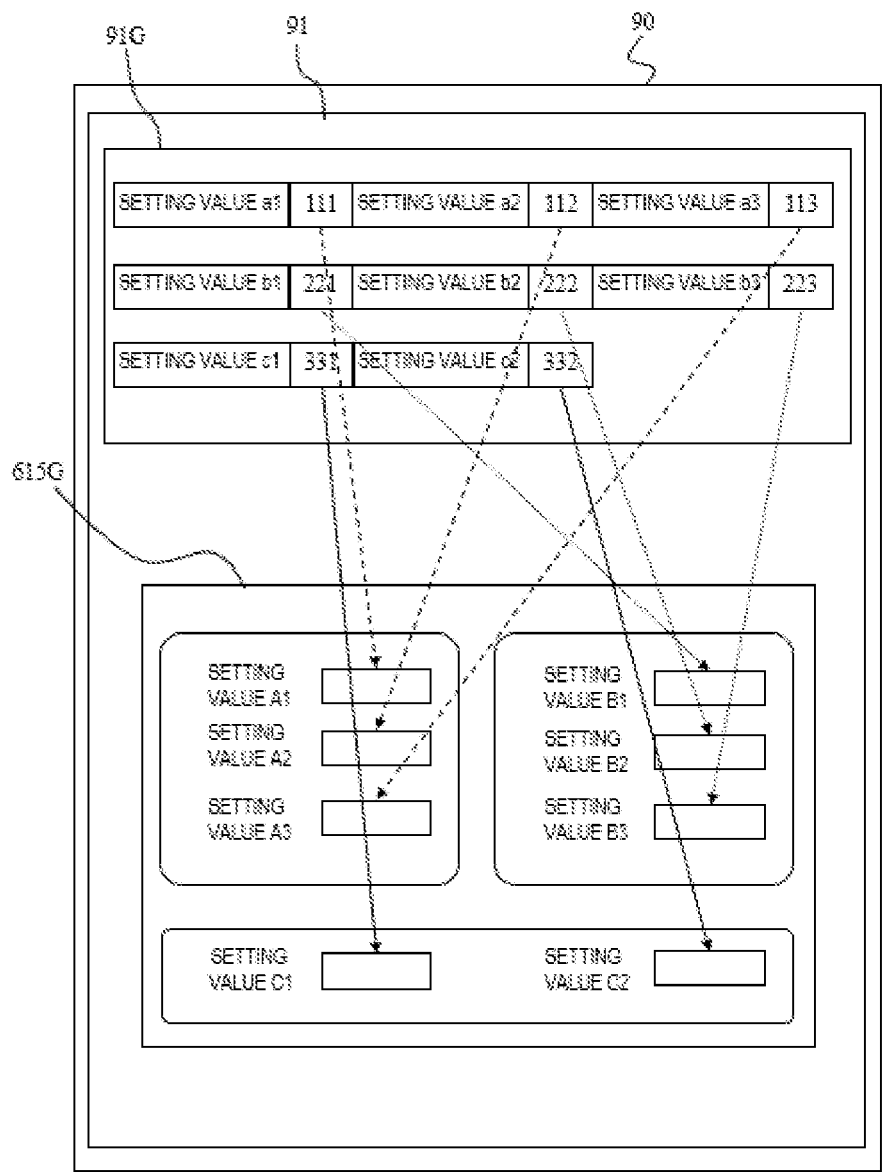

FIG. 12

MOLDING MACHINE-SPECIFIC GUI — G1

TEMPERATURE — GP11

|  |  | N2 | N1 | Z4 | Z3 | Z2 | Z1 |
|---|---|---|---|---|---|---|---|
| MOLD | °C |  |  |  |  |  |  |
| ACTUAL MEASUREMENT | °C |  |  |  |  |  |  |

|  |  | M1 |
|---|---|---|
| MOLD SETTING | °C |  |
| MOLD ACTUAL MEASUREMENT | °C |  |

PLASTICIZATION — GP12

FILLING

|  |  | 4th | 3rd | 2nd | 1st |
|---|---|---|---|---|---|
| POSITION | mm |  |  |  |  |
| SPEED | mm/s |  |  |  |  |
| PRESSURE | MPa |  |  |  |  |
| TIME | s |  |  |  |  |

PRESSURE HOLDING

|  |  | 4th | 3rd | 2nd | 1st |
|---|---|---|---|---|---|
| PRESSURE | MPa |  |  |  |  |
| TIME | s |  |  |  |  |

PRESSURE HOLDING SPEED | mm/s |

COOLING | s |

MEASUREMENT

|  |  | 1st | 2nd |
|---|---|---|---|
| POSITION | mm |  |  |
| PRESSURE | MPa |  |  |
| ROTATION SPEED | rpm |  |  |

+ SUCKBACK

| AMOUNT | mm |  |
|---|---|---|
| SPEED | MPa |  |
| DELAY | s |  |

MOLD OPENING AND CLOSING — GP13

| MOLD CLAMPING FORCE | kN |  |
|---|---|---|

| MOLD THICKNESS | mm |  |
|---|---|---|

FIG. 13

| | USER-SPECIFIC GUI | | | G2 | | | | |
|---|---|---|---|---|---|---|---|---|
| | ITEM | | | PROTOTYPE NUMBER | | | | |
| | | | | PROTOTYPE DATE | | | | |
| | MOLD CLAMPING PRESSURE | | | t | | | | |
| GP21 | MOLDING TEMPERATURE | MOLD | MOVABLE SIDE | °C | | | | |
| | | | FIXED SIDE | °C | | | | |
| | | NOZZLE | BEFORE | °C | | | | |
| | | | AFTER | °C | | | | |
| | | CYLINDER | BEFORE (MEASUREMENT) | °C | | | | |
| | | | MEDIUM (COMPRESSION) | °C | | | | |
| | | | AFTER (SUPPLY) | °C | | | | |
| | | | UNDER HOPPER | °C | | | | |
| GP22 | STAGE NUMBER | INJECTION | | STAGE | | | | |
| | | PRESSURE HOLDING | | STAGE | | | | |
| | | MEASUREMENT | | STAGE | | | | |
| GP23 | SPEED | INJECTION | 1 SPEED | mm/s | | | | |
| | | | 2 SPEED | mm/s | | | | |
| | | | 3 SPEED | mm/s | | | | |
| | | PRESSURE HOLDING | 1 PRESSURE | mm/s | | | | |
| | | | 2 PRESSURE | mm/s | | | | |
| | | | 3 PRESSURE | mm/s | | | | |
| GP24 | PRESSURE | INJECTION | 1 SPEED | MPa | | | | |
| | | | 2 SPEED | MPa | | | | |
| | | | 3 SPEED | MPa | | | | |
| | | PRESSURE HOLDING | 1 PRESSURE | kgf/m2 | | | | |
| | | | 2 PRESSURE | MPa | | | | |
| | | | 3 PRESSURE | MPa | | | | |
| GP25 | TIME | INJECTION | | s | | | | |
| | | PRESSURE HOLDING | 1 PRESSURE | s | | | | |
| | | | 2 PRESSURE | s | | | | |
| | | | 3 PRESSURE | s | | | | |
| GP26 | SWITCHING POSITION | INJECTION | 1 SPEED | | | | | |
| | | | 2 SPEED | | | | | |
| | | | 3 SPEED | | | | | |
| | VP | | | mm | | | | |
| | COOLING TIME | | | s | | | | |
| | MOLDING CYCLE | | | s | | | | |
| GP27 | MEASUREMENT | BACK PRESSURE | | MPa | | | | |
| | | ROTATION SPEED | | rpm | | | | |
| | | MEASUREMENT POSITION | | mm | | | | |
| | | SUCKBACK | | mm | | | | |
| | | BACK PRESSURE SPEED | | mm/s | | | | |

FIG. 14

STANDARD GUI — G3

TEMPERATURE (GP31)

| | | [1.1] | [1.2] | | |
|---|---|---|---|---|---|
| NOZZLE | °C | | | | |
| BARREL | °C | [1.1] | [1.2] | [1.3] | [1.4] |
| MOLD SETTING | °C | [1] | [2] | [3] | [4] |
| MOLD ACTUAL MEASUREMENT | °C | | | | |

MEASUREMENT (GP32)

| | | | | |
|---|---|---|---|---|
| ROTATION SPEED | rpm | [1.1] | [1.2] | |
| BACK PRESSURE | MPa | [1.1] | [1.2] | [1.3] |
| SWITCHING POSITION | mm | | | |
| MEASUREMENT COMPLETION POSITION SETTING VALUE | mm | | | |
| SUCKBACK BEFORE MEASUREMENT | mm | | | |
| SUCKBACK AFTER MEASUREMENT | mm | | | |
| MEASUREMENT TIME | s | | CONTROL MODE [1] | |

INJECTION (GP33)

| | | [1.5] | [1.4] | [1.3] | [1.2] | [1.1] |
|---|---|---|---|---|---|---|
| SPEED | mm/s | | | | | |
| SWITCHING POSITION | mm | | | | | |
| PRESSURE | MPa | | | | | |

| VP SWITCHING POSITION | mm | | CONTROL MODE [1] | |
|---|---|---|---|---|
| FILLING TIME | s | | CONTROL MODE [2] | |
| CUSHION POSITION | mm | | | |

PRESSURE HOLDING (GP34)

| | | [1.5] | [1.4] | [1.3] | [1.2] | [1.1] |
|---|---|---|---|---|---|---|
| PRESSURE | MPa | | | | | |
| TIME | s | | | | | |
| SPEED | mm/s | | | | | |

| COOLING TIME | s | |
|---|---|---|

OTHERS (GP35)

| MOLD CLAMPING FORCE | kN | | CYCLE TIME | s | |
|---|---|---|---|---|---|

INJECTION MOLDING SYSTEM AND SETTING SUPPORT METHOD FOR INJECTION MOLDING MACHINE

BACKGROUND OF THE INVENTION

1. Field of the Invention

The present invention relates to an injection molding system and a setting support method for an injection molding machine.

2. Description of the Related Art

In Japanese Patent No. 5709328 (PTL 1), a cloud server executes resin flow analysis based on machine parameters to generate an optimum injection condition, and the optimum injection condition is downloaded to a fully automatic injection molding machine to perform injection molding.

In the technique disclosed in PTL 1, the optimum molding condition is generated by analyzing a flow of a resin based on the machine parameters in the cloud server. In the technique disclosed in PTL 1, when the generated optimum molding condition is downloaded to a controller of an all-electric injection molding machine, the controller drives the all-electric injection molding machine based on the optimum molding condition. Therefore, PTL 1 is based on a premise that the optimum molding condition generated by the flow analysis is downloaded to the controller.

When the molding condition generated by the cloud server is downloaded to the controller, a data format on a cloud server side and a data format on a controller side need to match each other. When the data format on the cloud server side is different from the data format on the controller side, a gateway function for acquiring data generated by the cloud server and converting the data into the data format on the controller side is required.

However, at present, the data format of the controller is different for each manufacturer of the injection molding machine. In a factory having a plurality of injection molding machines, it is difficult to install the gateway function in all injection molding machines due to an increase in cost. Therefore, the technique in PTL 1 has a high introduction cost.

Further, in practice, a user (operator) often manually inputs molding conditions to the injection molding machine. However, even if specifications for inputting the molding conditions to the injection molding machine are of the same manufacturer, a graphic user interface (GUI) of an input screen differs depending on a year form and a model number.

When the manufacturers are different, the GUIs are much different. Therefore, for example, in a manufacturing factory having a plurality of injection molding machines, the user needs to input the molding conditions with knowledge of specifications of respective injection molding machines. Therefore, when the work skill of the user is poor, it takes a long time to input the molding conditions to the injection molding machine.

SUMMARY OF THE INVENTION

The invention has been made in view of the above problems. An object of the invention is to provide an injection molding system capable of improving usability for a user.

In order to solve the above problems, an injection molding system according to one aspect of the invention is an injection molding system including: one or more computers each including a processor and a storage device. The processor determines a combination of a mold and an injection molding machine and a specific molding condition specific to the combination of the mold and the injection molding machine, and outputs the determined specific molding condition in a predetermined form for manual input to the injection molding machine.

According to the invention, specific molding conditions can be output in a predetermined form for manual input to an injection molding machine.

BRIEF DESCRIPTION OF THE DRAWINGS

FIG. 11 is an explanatory diagram of an injection molding system according to a sixth embodiment.

FIG. 12 is an example of a molding machine-specific GUI template.

FIG. 13 is an example of a user-specific GUI template.

FIG. 14 is an example of a standard GUI template.

DESCRIPTION OF THE PREFERRED EMBODIMENTS

Figure 1:
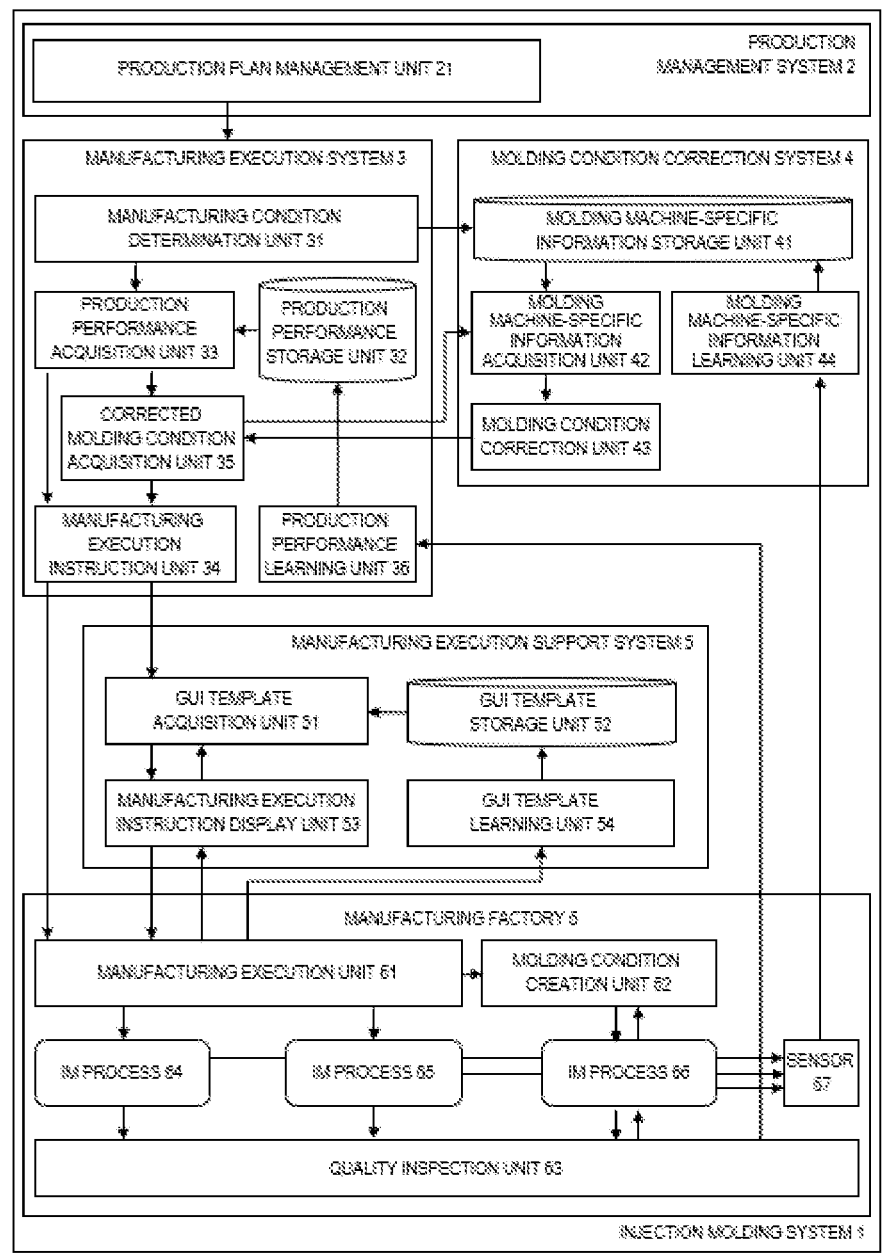
FIG. 1 is a functional block diagram of an injection molding system.

Hereinafter, embodiments of the invention will be described with reference to the drawings. An injection molding system according to the present embodiment outputs a determined specific molding condition in a predetermined form for manual input to an injection molding machine. In the present embodiment, a GUI in which the specific molding condition is applied to a GUI template corresponding to a GUI of a setting screen of the injection molding machine or a user-specific GUI template created in advance by a user is provided as a "predetermined form" to the user (operator) who sets the injection molding machine. The user looks at the GUI, inputs each parameter of the molding condition to the injection molding machine, and causes the injection molding machine to execute injection molding.

Therefore, according to the present embodiment, the molding condition can be displayed on any GUI in accordance with the environment of the user, and the molding condition can be input to the injection molding machine in a short time without depending on the skill of the user. That is, the system according to the present embodiment can provide the molding condition to the user in a similar manner to, for example, the GUI of the setting screen of the injection molding machine. Accordingly, the user can accurately and quickly input the molding condition without being familiar with the specification of the injection molding machine.

The specific molding condition is a molding condition specific to a combination of a mold and an injection molding machine. The specific molding condition can be obtained by, for example, the following predetermined method.

The predetermined method includes a step of confirming presence or absence of a first production performance using a combination of a first mold and a first injection molding machine by searching a production performance storage unit, and a corrected molding condition creation step of, when the first production performance exists, setting the first production performance as the specific molding condition, and, when the first production performance does not exist, creating a corrected molding condition for injection molding using the combination of the first injection molding machine and the first mold and setting the created corrected molding condition as the specific molding condition, based on first molding machine-specific information acquired in advance for the first injection molding machine, second molding machine-specific information acquired in advance for a second injection molding machine having a second production performance, which is combined with the first mold, and the second production performance acquired from the production performance storage unit.

Hereinafter, embodiments will be described with reference to the drawings. The present embodiment includes a step of determining, as a manufacturing condition, a combination of a mold and an injection molding machine and a molding condition based on the combination of the mold and the injection molding machine, and a step of inputting and displaying the determined specific molding condition in any GUI template with reference to a plurality of GUI templates registered in advance. The displayed specific molding condition is input to the injection molding machine to execute injection molding. Hereinafter, setting the molding condition in the injection molding machine may be represented as inputting the molding condition to the injection molding machine. Similarly, the setting screen may be referred to as an input screen.

First Embodiment

A first embodiment will be described with reference to FIGS. 1 to 6. FIG. 1 is a functional block diagram of an injection molding system (or an injection molding method) 1.

The injection molding system 1 includes, for example, a production management system 2, a manufacturing execution system 3, a molding condition correction system 4, a manufacturing execution support system 5, and a manufacturing factory 6. A part or all of functions of the injection molding system 1 described below may be constituted as software, may be implemented by cooperation of software and hardware, or may be implemented using hardware having a fixed circuit. At least a part of the functions may be implemented by using hardware capable of changing a part of circuits. At least a part of the functions of the production management system 2, the manufacturing execution system 3, and the manufacturing factory 6 may be manually executed by the user.

The production management system 2 is a system that manages a production plan, and includes at least a production plan management unit 21. The production plan management unit 21 has a function of generating a production plan including a production specification, a quantity, a period, and the like in accordance with an order reception status and an inventory status.

The manufacturing execution system 3 is a system that instructs the manufacturing factory 6 to execute production. The manufacturing execution system 3 determines a manufacturing condition and a molding condition based on the production plan generated by the production management system 2, and sends a manufacturing execution instruction including the manufacturing condition and the molding condition to the manufacturing factory 6. The manufacturing condition includes, for example, information for specifying the injection molding machine used for production (injection molding), information for specifying the mold used for production, information for specifying a material used for production, quantity of a molded article to be produced, and a production period.

The manufacturing execution system 3 will be described. The manufacturing execution system 3 includes, for example, a manufacturing condition determination unit 31, a production performance storage unit 32, a production performance acquisition unit 33, a manufacturing execution instruction unit 34, a corrected molding condition acquisition unit 35, and a production performance learning unit 36.

The manufacturing condition determination unit 31 has a function of determining the manufacturing condition described above based on the production plan generated by the production plan management unit 21 of the production management system 2. The manufacturing condition determination unit 31 can transmit information on the manufacturing condition to the molding condition correction system 4. The information on the manufacturing condition may include predetermined information on the first mold and the first injection molding machine. The predetermined information includes, for example, capacity of the first mold and a runner configuration of the first mold. The predetermined information may further include, for example, a control mode (proportional-integral-differential (PID), setting value, and the like) of the first injection molding machine, and information of a unit system of each setting parameter to be input. The manufacturing condition determination unit 31 can also transmit one or both of computer aided design (CAD) data of the first mold and specification data and setting data of the first injection molding machine to the molding condition correction system 4 as "predetermined information". The molding condition correction system 4 stores the information received from the manufacturing condition determination unit 31 in the molding machine-specific information 41.

The production performance storage unit 32 has a function of storing a production performance. In the present embodiment, the production performance indicates the molding condition under which it is confirmed that a good molded article quality is obtained with respect to the combination of the injection molding machine and the mold.

The production performance acquisition unit 33 has a function of acquiring the production performance from the production performance storage unit 32. The production performance acquisition unit 33 reads and acquires, from the production performance storage unit 32, the production performance of the mold (hereinafter, referred to as the first mold) determined by the manufacturing condition determination unit 31 and the production performance of the combination of the injection molding machine (hereinafter, referred to as the first injection molding machine) and the first mold determined by the manufacturing condition determination unit 31.

When there is no production performance by the first mold, the production performance acquisition unit 34 requests the manufacturing execution instruction unit 32 to issue the molding condition. The request for issuing the molding condition means that an instruction to search for an appropriate molding condition is issued in the manufacturing factory 6. The manufacturing factory 6 searches for an appropriate molding condition while changing various parameters in accordance with the input manufacturing condition.

When there is the production performance by the combination of the first injection molding machine and the first mold, the production performance acquisition unit 33 outputs the production performance acquired from the production performance storage unit 32 to the manufacturing execution instruction unit 34. When there is the production performance by the first mold, but no production performance by the combination of the first injection molding machine and the first mold, the production performance acquisition unit 33 requests the manufacturing execution instruction unit 34 to issue the molding condition. Alternatively, the production performance acquisition unit 33 instructs the corrected molding condition acquisition unit 35 to acquire the corrected molding condition.

The corrected molding condition acquisition unit 35 has a function of acquiring, from the molding condition correction system 4, the corrected molding condition based on the combination of the first injection molding machine and the first mold determined by the manufacturing condition determination unit 31.

The corrected molding condition acquisition unit 35 has a function of requesting the molding condition correction system 4 to generate the corrected molding condition and acquiring the corrected molding condition generated by the molding condition correction system 4. The corrected molding condition acquisition unit 35 acquires the corrected molding condition from the molding condition correction system 4 by sending basic information necessary for creating the corrected molding condition to the molding condition correction system 4.

The basic information necessary for generating the corrected molding condition includes, for example, the first injection molding machine and the first mold determined by the manufacturing condition determination unit 31, another injection molding machine (hereinafter, referred to as a second injection molding machine) having a production performance, which is combined with the first mold, and a production performance (second production performance) by a combination of the second injection molding machine and the first mold.

When the corrected molding condition acquisition unit 35 acquires the corrected molding condition from the molding condition correction system 4, the corrected molding condition acquisition unit 35 outputs the acquired corrected molding condition to the manufacturing execution instruction unit 34.

The manufacturing execution instruction unit 34 has a function of instructing the manufacturing factory 6 to execute manufacturing. The manufacturing execution can also be referred to as production. A content of the manufacturing execution instruction includes, for example, any one of a molding condition issuing request or production performance input by the production performance acquisition unit 33 and the corrected molding condition acquired by the corrected molding condition acquisition unit 35, and the manufacturing condition determined by the manufacturing condition determination unit 31. The manufacturing execution instruction unit 34 also has a function of causing the manufacturing execution support system to display the content of the manufacturing execution instruction. The manufacturing execution instruction unit 34 also has a function of determining whether the first injection molding machine can input the molding condition without intervention of the user of the manufacturing factory 6.

In a case where the molding condition can be input from the manufacturing execution instruction unit 34 to the first injection molding machine without the intervention of the user of the manufacturing factory 6, the manufacturing execution instruction unit 34 can directly instruct the manufacturing factory 6 to execute the manufacturing. The case where the molding condition can be input from the manufacturing execution instruction unit 34 to the first injection molding machine without the intervention the user of the manufacturing factory 6 includes, for example, a case where a format of the data of the molding condition in the manufacturing execution system 3 and a format of the data of the molding condition in the first injection molding machine match each other, and a communication interface connecting the manufacturing execution instruction unit 34 and the first injection molding machine is connected. Alternatively, the above case includes a case where, even when the formats of the data are different, the first injection molding machine is installed with a gateway function for acquiring the data of the molding condition from the manufacturing execution instruction unit 34 and converting the data, or a case where an external device having a gateway function is connected to the first injection molding machine.

When the molding condition cannot be input from the manufacturing execution instruction unit 34 to the first injection molding machine without the intervention of the user of the manufacturing factory 6, the manufacturing execution instruction unit 34 causes the manufacturing execution support system 5 to display the content of the manufacturing execution instruction before the manufacturing execution instruction is sent to the manufacturing factory 6.

The production performance learning unit 36 has a function of recording, into the production performance storage unit 32, the molding condition under which it is confirmed that the good molded article quality is obtained in the manufacturing factory 6. The production performance learning unit 36 registers, in the production performance storage unit 32, the molding condition under which the quality equal to or higher than a predetermined standard is obtained, based on the information indicating a quality result of the molded article acquired from a quality inspection unit 63 of the manufacturing factory 6.

The molding condition correction system 4 will be described. The molding condition correction system 4 has a function of correcting the molding condition based on the production performance input from the manufacturing execution system 3 and the molding machine-specific information acquired in advance. The molding condition that has been corrected is referred to as the corrected molding condition.

The molding machine-specific information in the present embodiment is information specific to each injection molding machine, and includes not only the model number and the specification of the injection molding machine but also a machine difference specific to the injection molding machine.

The machine difference in the present embodiment is a difference between an input molding condition and a physical quantity at a predetermined position in the mold when the same molding condition is input to a plurality of injection molding machines.

The predetermined position in the mold is, for example, a resin inlet of the mold. The physical quantity includes, for example, a pressure of the resin, a temperature of the resin, a speed of the resin, material properties of the resin, and an opening amount of the mold (mold opening amount). The material properties include, for example, a density of the resin, a viscosity of the resin, and a distribution of a fiber length of the resin (in the case of a reinforcing fiber-containing material). The machine difference is considered to be caused not only by a difference in a configuration of an injection molding machine 60 described later with reference to FIG. 3 but also by, for example, a difference in control algorithm (control mode, setting value) such as pressure control or temperature control, or a difference in accessory equipment such as a mold temperature regulator (not shown).

The molding condition correction system 4 includes, for example, a molding machine-specific information storage unit 41, a molding machine-specific information acquisition unit 42, a molding condition correction unit 43, and a molding machine-specific information learning unit 44.

The molding machine-specific information storage unit 41 has a function of storing the molding machine-specific information acquired in advance for each injection molding machine.

The molding machine-specific information acquisition unit has a function of acquiring, from the molding machine-specific information storage unit 41, the molding machine-specific information and the like of the injection molding machine specified by the manufacturing execution system 3. The molding machine-specific information acquisition unit 42 acquires the molding machine-specific information (first molding machine-specific information) of the first injection molding machine and the molding machine-specific information (second molding machine-specific information) of the second injection molding machine from the corrected molding condition acquisition unit 35 of the manufacturing execution system 3, and outputs the acquired molding machine-specific information to the molding condition correction unit 43. The molding machine-specific information acquisition unit 42 can also receive the production performance acquired by the production performance acquisition unit 33 from the production performance storage unit 32 via the corrected molding condition acquisition unit 35 and pass the received production performance to the molding condition correction unit 43.

The molding condition correction unit 43 has a function of correcting the molding condition based on the information input from the molding machine-specific information acquisition unit 42. The molding condition correction unit 43 has a function of generating the corrected molding condition by correcting the molding condition based on the first molding machine-specific information and the second molding machine-specific information, which are input from the molding machine-specific information acquisition unit 42, and the production performance by the combination of the second injection molding machine and the first mold. The molding condition correction unit 43 transmits the generated corrected molding condition to the corrected molding condition acquisition unit 35 of the manufacturing execution system 3.

The molding machine-specific information learning unit 44 has a function of extracting a feature amount of a physical quantity based on data (sensing data) from a sensor 67 provided in the injection molding machine 60 or the mold, and storing the feature amount into the molding machine-specific information storage unit 41 as machine difference information. That is, the molding machine-specific information learning unit extracts a feature amount from sensing data in injection molding processes 64 to 66 obtained from the manufacturing factory 6, and stores the extracted feature amount into the molding machine-specific information storage unit 41 as the machine difference information.

The manufacturing execution support system 5 will be described. Upon receiving the request from the manufacturing execution system 3, the manufacturing execution support system displays the content of the manufacturing execution instruction in the manufacturing factory 6. The manufacturing execution support system 5 is a system that supports input of the molding condition to the injection molding machine 60.

The manufacturing execution support system 5 includes, for example, a GUI template acquisition unit 51, a GUI template storage unit 52, a manufacturing execution instruction display unit 53, and a GUI template learning unit 54.

The GUI template acquisition unit 51 acquires one GUI template from the GUI template storage unit 52 when receiving a display request of the content of the manufacturing execution instruction from the manufacturing execution instruction unit 34 of the manufacturing execution system 3. The GUI template acquisition unit 51 inputs the acquired GUI template and the content of the manufacturing execution instruction input from the manufacturing execution instruction unit 34 to the manufacturing execution instruction display unit 53.

The GUI template that is an example of the "predetermined form" is, for example, screen configuration information that defines a layout or a design for displaying each setting parameter of the molding condition for at least the molding condition (here, any one of the production performance and the corrected molding condition) included in the manufacturing execution instruction.

By the GUI template, molding conditions can be displayed by classifying the molding conditions for each setting parameter related to each process of an injection molding process to be described later, such as a measurement and plasticization process, and an injection and pressure holding process. Alternatively, the molding conditions can be displayed by classifying the molding conditions for each setting parameter related to the physical quantity such as a pressure, a temperature, a speed, and a mold clamping force by the GUI template.

As described above, in the present embodiment, any GUI template can be created and used in accordance with a work environment of the user (a work environment for setting the molding condition in the injection molding machine 60). Since a unit system of the physical quantity input by the injection molding machine may be different, the unit system is also displayed for each setting parameter in the GUI template.

In the present embodiment, the GUI template is classified into a GUI template associated with the injection molding machine (hereinafter, referred to as a molding machine-specific GUI template), a user-specific GUI template created by the user (hereinafter, referred to as a user-specific GUI template), and a GUI template (standard GUI template) which is normally applied when none of the GUI templates is applied. The molding machine-specific GUI template corresponds to a "first predetermined form". The user-specific GUI template corresponds to a "second predetermined form". The standard GUI template corresponds to a "third predetermined form".

For example, the GUI template acquisition unit 51 acquires the molding machine-specific GUI template associated with the first injection molding machine from the GUI template storage unit 52 with reference to information on the first injection molding machine among the contents of the manufacturing execution instruction by the manufacturing execution instruction unit 34.

In this case, for the molding machine-specific GUI template, for example, a template having a layout or design similar to a GUI (see FIGS. 3 and 10) of a molding condition setting screen 615 in the first injection molding machine is registered. Accordingly, even when the user who handles the injection molding machine 60 in the manufacturing factory 6 is not familiar with the GUI of the setting screen of the molding condition in the first injection molding machine, the user can input the molding condition to the first injection molding machine in a short time without hesitation in operation by referring to the molding condition displayed by the manufacturing execution support system 5.

The expression "the molding machine-specific GUI template similar to the GUI of the setting screen of the injection molding machine" means that it is similar enough to support the manual input of each parameter to be set. For example, if a relative relationship between setting positions (input positions) of the parameters on the setting screen is substantially the same, the user can input the parameters of the molding conditions specified by the manufacturing execution instruction unit 34 to the setting screen of the injection molding machine without hesitation in operation. The relative relationship between the setting positions of the parameters does not need to be exactly the same. When the user looks at the molding machine-specific GUI template, it is sufficient that the parameters shown in the GUI template are similar to an extent that it is clear where each parameter should be set on the actual setting screen.

The GUI template acquisition unit 51 can receive the acquisition of the GUI template (user-specific GUI template) requested by the user of the manufacturing factory 6 from the manufacturing execution instruction display unit 53. The GUI template acquisition unit 51 acquires, from the GUI template storage unit 52, the user-specific GUI template requested from the manufacturing execution instruction display unit 53, and inputs the acquired user-specific GUI template to the manufacturing execution instruction display unit 53.

For example, in the manufacturing factory 6, a user-specific GUI template for displaying the content of the manufacturing execution instruction is defined, and the user-specific GUI template may be used for a long period of time. In this case, since the user of the manufacturing factory 6 is familiar with the use of the user-specific GUI template, the user of the manufacturing factory 6 can also request application of the familiar user-specific GUI template. Accordingly, the user of the manufacturing factory 6 can input the molding condition to the first injection molding machine in a short time without overlooking input items by referring to the familiar user-specific GUI template.

The GUI template storage unit 52 has a function of storing the GUI template. The GUI template storage unit 52 outputs the GUI template requested by the GUI template acquisition unit 51 to the GUI template acquisition unit 51. The GUI template storage unit 52 stores the GUI template input from the GUI template learning unit 54.

The manufacturing execution instruction display unit 53 supports manual input of the user by displaying the manufacturing execution instruction from the manufacturing execution instruction unit 34 to the user who operates the injection molding machine 60. That is, the manufacturing execution instruction display unit 53 supports the manual input of the molding condition to the injection molding machine 60 by the user of the manufacturing factory 6 based on the GUI template input from the GUI template acquisition unit 51 and the manufacturing execution instruction from the manufacturing execution instruction unit 34. The manufacturing execution instruction display unit 53 has a function of generating a screen for displaying the molding condition by applying the GUI template to at least the molding condition included in the manufacturing execution instruction, and providing the user of the manufacturing factory 6 with the contents of other manufacturing execution instructions included in the generated screen.

The manufacturing execution instruction display unit 53 can also receive a template use request from a manufacturing execution unit 61 of the manufacturing factory 6. The user can request application of any GUI template from the manufacturing execution unit 61 to the manufacturing execution display unit 53.

Upon receiving the request from the user, the manufacturing execution instruction display unit 53 instructs the GUI template acquisition unit 51 to acquire the requested GUI template. The manufacturing execution instruction display unit 53 generates a screen for displaying the molding condition by applying the GUI template requested by the user to the molding condition included in the manufacturing execution instruction, and provides the user of the manufacturing factory with the contents of other manufacturing execution instructions included in the generated screen.

As for the display of the content of the manufacturing execution instruction by the manufacturing execution instruction display unit 53, the content of the manufacturing execution instruction printed on a paper surface may be passed to the user, or the content of the manufacturing execution instruction may be displayed on a computer used by the user.

That is, the "predetermined form" may be one printed on a physical print medium such as paper, a plate, or a film, or may be an electronic medium such as data or a file displayed on a screen of a terminal used by a user. There is no limitation on the type of the terminal used by the user. The user can cause, for example, a laptop computer, a desktop computer, a doublet computer, a wearable computer, or a mobile phone (including a smartphone) to display the content of the manufacturing execution instruction transmitted from the manufacturing execution instruction display unit 53. Alternatively, a GUI template in which each parameter is displayed can be displayed on a monitor display having a communication function and a display function. A GUI unit 70, which will be described later, can be used as a unit for presenting the GUI template to the user.

The GUI template learning unit 54 newly registers the GUI template in the GUI template storage unit 52 or updates the GUI template stored in the GUI template storage unit 52 in accordance with a request from the manufacturing execution unit 61 of the manufacturing factory 6. The user can store a new user-specific GUI template or a new molding machine-specific GUI template into the GUI template storage unit 52. The user can change and update a part of the user-specific GUI template or the molding machine-specific GUI template stored in the GUI template storage unit 52.

The manufacturing factory 6 will be described. The manufacturing factory 6 receives the manufacturing execution instruction from the manufacturing execution system 3 and executes any one or more of the injection molding processes 64 to 66. In FIG. 1, the injection molding may be abbreviated as "IM". The manufacturing factory 6 can refer to the content of the manufacturing execution instruction displayed on the manufacturing execution support system 5.

The manufacturing factory 6 includes, for example, the manufacturing execution unit 61, a plurality of injection molding machines 60 (described later in FIG. 3), a plurality of molds (described later in FIG. 3), a molding condition creation unit 62, and the molded article quality inspection unit 63. Hereinafter, the molded article quality inspection unit 63 may be abbreviated as the quality inspection unit 63.

The manufacturing execution unit 61 executes the injection molding process based on the manufacturing conditions input from the manufacturing execution instruction unit 34 of the manufacturing execution system 3. When the corrected molding condition is input, the manufacturing execution unit 61 executes the injection molding process 64 by inputting the corrected molding condition for the combination of the injection molding machine and the mold specified in the manufacturing condition. That is, the injection molding process 64 is a process of performing the injection molding based on the corrected molding condition.

When the corrected molding condition can be input from the manufacturing execution instruction unit 34 of the manufacturing execution system 3 to the first injection molding machine without the intervention of the user of the manufacturing factory 6, the manufacturing factory 6 downloads the corrected molding condition included in the manufacturing execution instruction from the manufacturing execution instruction unit 34 to the first injection molding machine, thereby executing the injection molding process 64 without manual setting of the corrected molding condition by the user of the manufacturing factory 6.

When the corrected molding condition cannot be input from the manufacturing execution instruction unit 34 of the manufacturing execution system 3 to the first injection molding machine without the intervention of the user of the manufacturing factory 6, the user of the manufacturing factory 6 inputs the corrected molding condition among the contents of the manufacturing execution instruction displayed on the manufacturing execution instruction display unit 53 of the manufacturing execution support system 5 to the first injection molding machine and executes the injection molding process 64.

When the production performance is input, the manufacturing execution unit 61 executes the injection molding process 65 by inputting the production performance for a specified combination of the injection molding machine and the mold. That is, the injection molding process 65 is an injection molding process that is performed under molding conditions under which good production performance is achieved by using a specified combination of the injection molding machine and the mold.

When the production performance can be directly input to the first injection molding machine from the manufacturing execution instruction unit 34 of the manufacturing execution system 3 without the intervention of the user of the manufacturing factory 6, the manufacturing factory 6 can execute the injection molding process 65 without manual input of the production performance by the user of the manufacturing factory 6 by downloading the production performance included in the manufacturing execution instruction from the manufacturing execution instruction unit 34 to the first injection molding machine.

When the production performance cannot be input from the manufacturing execution instruction unit 34 of the manufacturing execution system 3 to the first injection molding machine without the intervention of the user of the manufacturing factory 6, the user of the manufacturing factory 6 manually inputs, to the first injection molding machine, the production performance among the contents of the manufacturing execution instruction displayed on the manufacturing execution instruction display unit 53 of the manufacturing execution support system 5, and causes the first injection molding machine to execute the injection molding process 65.

When the molding condition issuing request is input, the manufacturing execution unit 61 issues a molding condition issuing instruction to the molding condition creation unit 62. When the molding condition creation unit 62 receives the molding condition issuing request from the manufacturing execution unit 61, the molding condition creation unit 62 derives an optimum molding condition for stably obtaining a good product. When the molding conditions are derived, a flow of the resin is analyzed in advance, and the molding conditions are roughly found, so that the time for issuing the molding condition can be shortened. In the quality inspection unit 63, when it is confirmed that a good product is stably obtained according to the derived molding condition, the derived optimum molding condition is input and the injection molding process 66 is executed. That is, the injection molding process 66 is a process in which the molding condition is derived and the injection molding is performed according to the derived molding condition.

The user of the manufacturing factory 6 can refer to the contents of the manufacturing execution instruction displayed on the manufacturing execution instruction display unit 53 of the manufacturing execution support system 5 and request the manufacturing execution instruction display unit 53 to apply any GUI template as necessary. In this case, the user can confirm the content of the manufacturing execution instruction in a state where the requested GUI template is applied. For example, when the GUI template of the molding condition initially displayed on the manufacturing execution instruction display unit 53 is difficult for the user to use, the user can request the manufacturing execution instruction display unit 53 to apply a familiar GUI template.

The quality inspection unit 63 has a function of determining whether the quality of the molded article obtained by the injection molding process is good or bad. The molded article quality is evaluated based on, for example, dimensions, an amount of warpage, burrs, scratches, gloss, and colors. The quality inspection of the molded article may be performed automatically, may be performed manually by an inspector, or may be performed semi-automatically.

When the quality of the molded article is good, the quality inspection unit 63 outputs the manufacturing condition, the combination of the injection molding machine and the mold, the molding condition, and an inspection result of the molded article quality to the production performance learning unit 36 of the manufacturing execution system 3.

The molding machine-specific information according to the present embodiment is acquired by measuring the physical quantity at the predetermined position in the mold by the sensor installed on each injection molding machine and the mold held in the manufacturing factory 6 in advance and outputting the physical quantity to the molding condition correction system 4.

Figure 2:
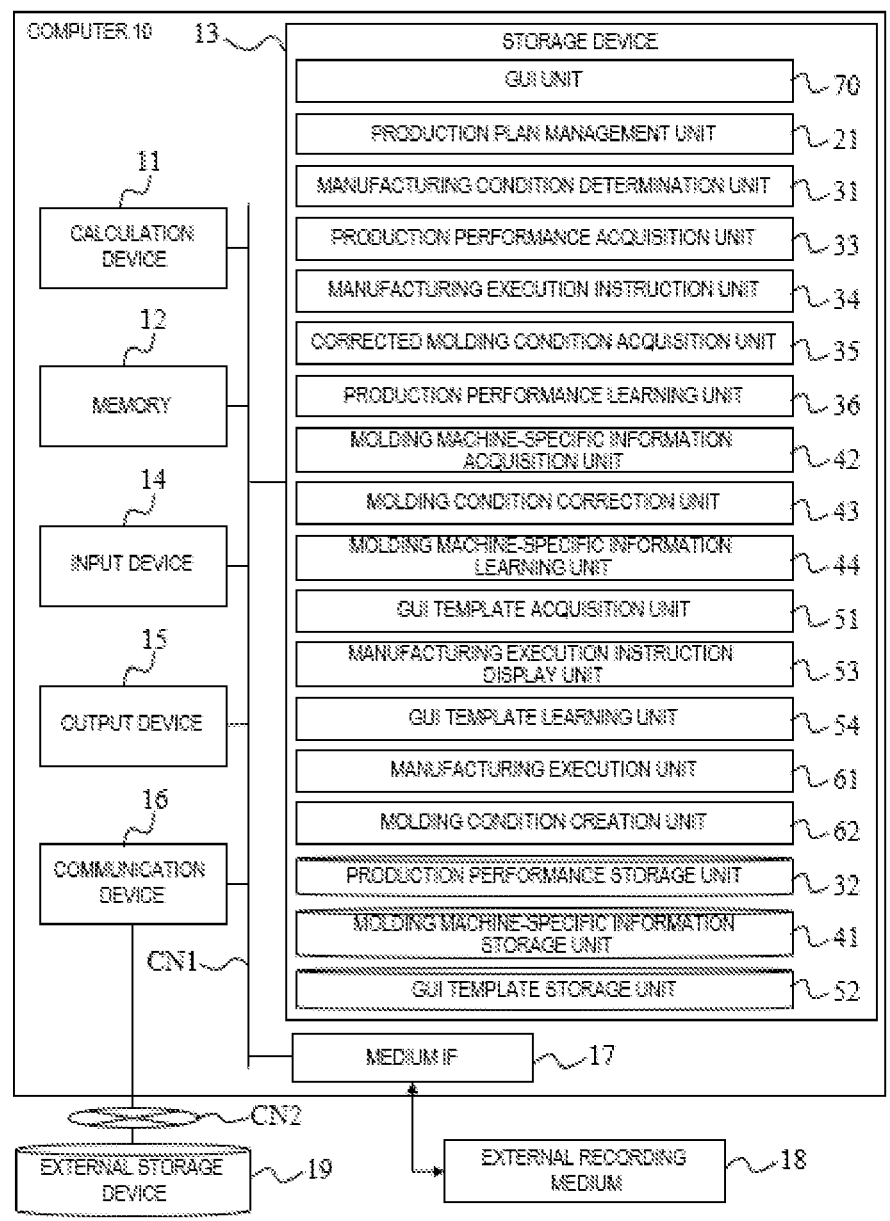
FIG. 2 is an explanatory diagram showing a hardware configuration and a software configuration of a computer that can be used to implement the injection molding system.

FIG. 2 shows a configuration example of a computer 10 that can be used to implement the injection molding system 1 according to the present embodiment. Here, a case where the injection molding system 1 is implemented from one computer 10 will be described, whereas the invention is not limited thereto. One or a plurality of injection molding systems 1 can be constructed by linking a plurality of computers. As described above, the production management system 2, the manufacturing execution system 3, and the manufacturing factory 6 can also implement the injection molding system 1 by the user performing a part or all of the functions without using dedicated software or hardware.

As in another embodiment described later, the molding condition correction system 4 can be constructed as software that functions on a cloud server and shared with a plurality of users. In this case, the molding machine-specific information recorded in the molding machine-specific information storage unit 41 can be shared among a plurality of users. In this case, when the number of users increases, the number of cases in which the corrected molding condition can be acquired using the molding machine-specific information acquired by another user increases. Therefore, the number of man-hours for acquiring the molding machine-specific information can be reduced.

The computer 10 includes, for example, a calculation device 11, a memory 12, a storage device 13, an input device 14, an output device 15, a communication device 16, and a medium interface unit 17. The devices 11 to 17 are connected via a communication path CN1. The communication path CN1 is, for example, an internal bus, or a local area network (LAN).

The calculation device 11 is implemented by, for example, a processor (for example, micro-processor unit (MPU), CPU, or GPU) or the like. The calculation device 11 reads a computer program stored in the storage device 13 into the memory 12 and executes the computer program, thereby implementing functions 21, 31 to 36, 41 to 44, 51 to 55, 61, and 62 as the injection molding system 1.

The storage device 13 is a device that stores a computer program and data, and includes, for example, a rewritable storage medium such as a flash memory or a hard disk. The storage device 13 stores a computer program for implementing the GUI unit 70 that provides a graphic user interface (GUI) to the user, and a computer program for implementing the above functions 21, 31 to 36, 41 to 44, 51 to 55, 61, and 62.

The input device 14 is a device through which the user inputs information to the computer 10. Examples of the input device 14 include a keyboard, a touch panel, a pointing device such as a mouse, and a voice instruction device (all of which are not shown). The output device 15 is a device from which the computer 10 outputs information. Examples of the output device 15 include a display, a printer, and a voice synthesis device (all of which are not shown).

The communication device 16 is a device that causes an external information processing device and the computer 10 to communicate with each other via a communication path CN2. Examples of the external information processing device include an external storage device 19 in addition to a computer (not shown). The computer 10 can read data (molding machine-specific information, production performance, and the like) and a computer program stored in the external storage device 19. The computer 10 can also transmit all or part of the computer programs and data stored in the storage device 13 to the external storage device 19 and store the computer programs and data.

The medium interface unit 17 is a device that reads and writes data from and to an external recording medium 18. Examples of the external recording medium 18 include a universal serial bus (USB) memory, a memory card, and a hard disk. The computer program and the data may be transferred from the external recording medium 18 to the storage device 13, or all or a part of the computer program and the data stored in the storage device 13 may be transferred to the external recording medium 18 and stored therein.

Figure 3:
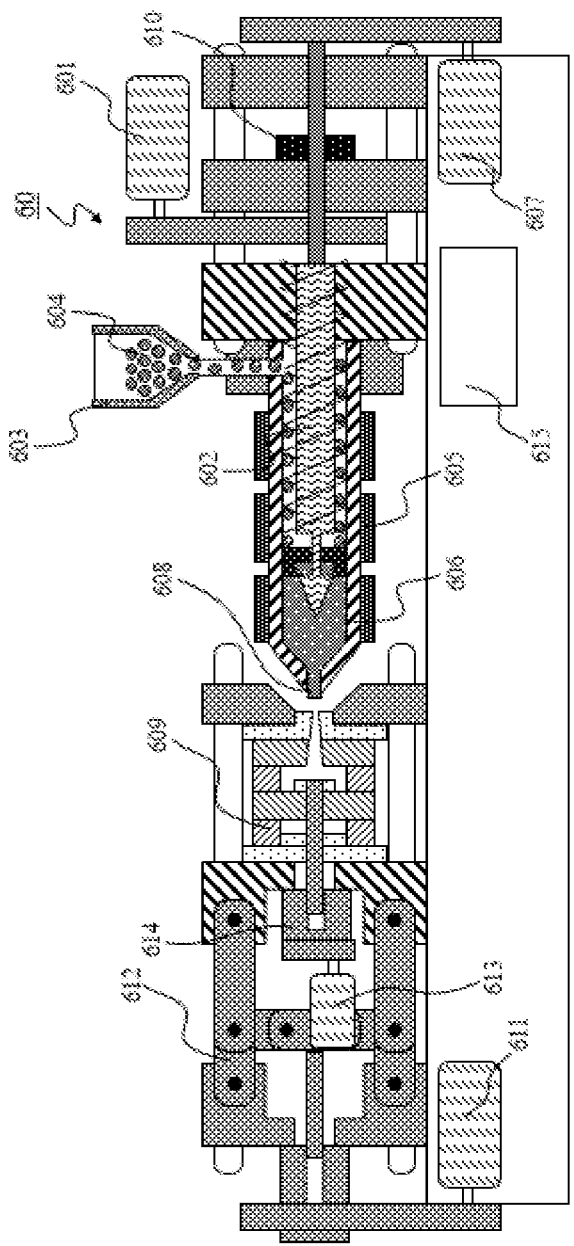
FIG. 3 is a cross-sectional view showing a configuration of an injection molding machine.

FIG. 3 shows an outline of the injection molding machine 60. Each process of the injection molding process will be described with reference to FIG. 3. In the present embodiment, a molding phenomenon refers to a series of phenomena occurring in the injection molding process. In the present embodiment, the injection molding process is roughly divided into a measurement and plasticization process, an injection and pressure holding process, a cooling process, and a taking-out process.

In the measurement and plasticization process, a screw 602 is retracted by using a plasticization motor 601 as a driving force, and resin pellets 604 are supplied from a hopper 603 into a cylinder 605. Then, by heating by a heater 606 and rotation of the screw 602, the resin is plasticized to be in a uniform molten state. By setting a back pressure and a rotation speed of the screw 602, a density of the molten resin and a degree of fracture of reinforcing fibers change. The changes influence the molded article quality.

In the injection and pressure holding process, the screw 602 is advanced by using an injection motor 607 as a driving force, and the molten resin is injected into a mold 609 through a nozzle 608. Cooling from a wall surface of the mold 609 and shear heat generation caused by the flow act on the molten resin injected into the mold 609 in parallel. That is, the molten resin flows toward the inside of a cavity of the mold 609 while receiving a cooling action and a heating action.

After the mold 609 is filled with the molten resin, a volume shrinkage caused by cooling of the molten resin is supplied to the mold 609 while holding the pressure. Here, when a mold clamping force, which is a force for closing the mold 609, is small with respect to the pressure during injection and the pressure during holding, a minute mold opening occurs after solidification of the molten resin, and the molded article quality is influenced by the minute gap.

In the cooling process, the molten resin is cooled to a temperature equal to or lower than a solidification temperature by the mold 609 maintained at a constant temperature. A residual stress generated in the cooling process influences the quality of the molded article. The residual stress is generated due to anisotropy of the material properties generated by the flow in the mold, a density distribution due to pressure holding, and unevenness of a molding shrinkage ratio.

In the taking-out process, the mold 609 is opened by driving a mold clamping mechanism 612 using a motor 611 that opens and closes the mold 609 as a driving force. Then, by driving an ejector mechanism 614 using a protruding motor 613 as a driving force, the solidified molded article is taken out of the mold 609. Thereafter, the mold 609 is closed toward the next shot. In the case of taking out the molded article from the mold 609, when a sufficient protruding force does not uniformly act on the molded article, the residual stress remains in the molded article, which influences the quality of the molded article.

In the injection molding machine 60, a pressure value by a load cell 610 is controlled so as to approach the pressure value within the input molding condition. The temperature of the cylinder 605 is controlled by a plurality of heaters 606. Depending on a shape of the screw 602, a shape of the cylinder 605, and a shape of the nozzle 608, a different pressure loss occurs for each injection molding machine. Accordingly, the pressure at the resin inlet of the mold 609 becomes a value lower than the pressure indicated by the molding condition input to the injection molding machine. Further, due to the arrangement of the heaters 606 and the shear heat generation of the resin in a nozzle portion, a resin temperature at the resin inlet of the mold 609 may be different from the resin temperature indicated by the molding condition input to the injection molding machine. The configuration of the injection mechanism (such as the shape of the screw 602, the shape of the cylinder 605, the shape of the nozzle 608, and the arrangement of the heaters 606) varies depending on the injection molding machine. Therefore, by correcting the molding condition such that the physical quantity of the molten resin at the resin inlet of the mold 609 becomes equal, the same molded article quality can be obtained even when different injection molding machines are used.

The quality of the molded article is evaluated by shape characteristics (weight, length, thickness, sink mark, burr, warp, and the like), surface characteristics such as poor appearance (weld, silver, burn, whitening, scratch, air bubble, peeling, flow mark, jetting, color and gloss, and the like), and mechanical and optical characteristics (tensile strength, impact resistance, and the like).

The shape characteristics have a strong correlation with a history of pressure and temperature and the mold clamping force in the injection and pressure holding process and the cooling process. Occurrence factors of the surface characteristics are different from each other with respect to the phenomenon that occurs. However, for example, the flow mark and the jetting have a strong correlation with the temperature and the speed of the resin in the injection process. For example, in the case of the tensile strength, the mechanical and optical characteristics need to be evaluated by a fracture test, and thus are often evaluated by other correlated quality indices such as weight.

Parameters corresponding to each process of the injection molding process are set as the molding conditions. In the measurement and plasticization process, a measurement position, a suckback, the back pressure, a back pressure speed, a rotation speed, and the like are set. In the injection and pressure holding process, the pressure, the temperature, the time, and the speed are set. In the injection and pressure holding process, a screw position (VP switching position) for switching between injection and pressure holding and the mold clamping force of the mold 609 are also set. In the cooling process, a cooling time after the pressure holding is set. The temperature of the plurality of heaters 606, the temperature and the flow rate of a coolant for cooling the mold 609, and the like are set as the parameters related to the temperature.

In the injection molding machine 60, the GUI of the molding condition setting screen 615 greatly differs depending on the manufacturer and the type. As described above, various parameters corresponding to each process of the injection molding process are set as the molding conditions. Therefore, when the user is not familiar with the GUI of the setting screen 615, it is difficult to manually set all the parameters in a short time.

Therefore, in the present embodiment, the molding conditions are presented to the user using a GUI template similar to the GUI of the setting screen 615 specific to the injection molding machine. The user can input a plurality of parameters to the setting screen 615 in a short time while looking at the molding conditions displayed on the GUI similar to the GUI to be operated.

Figure 4:
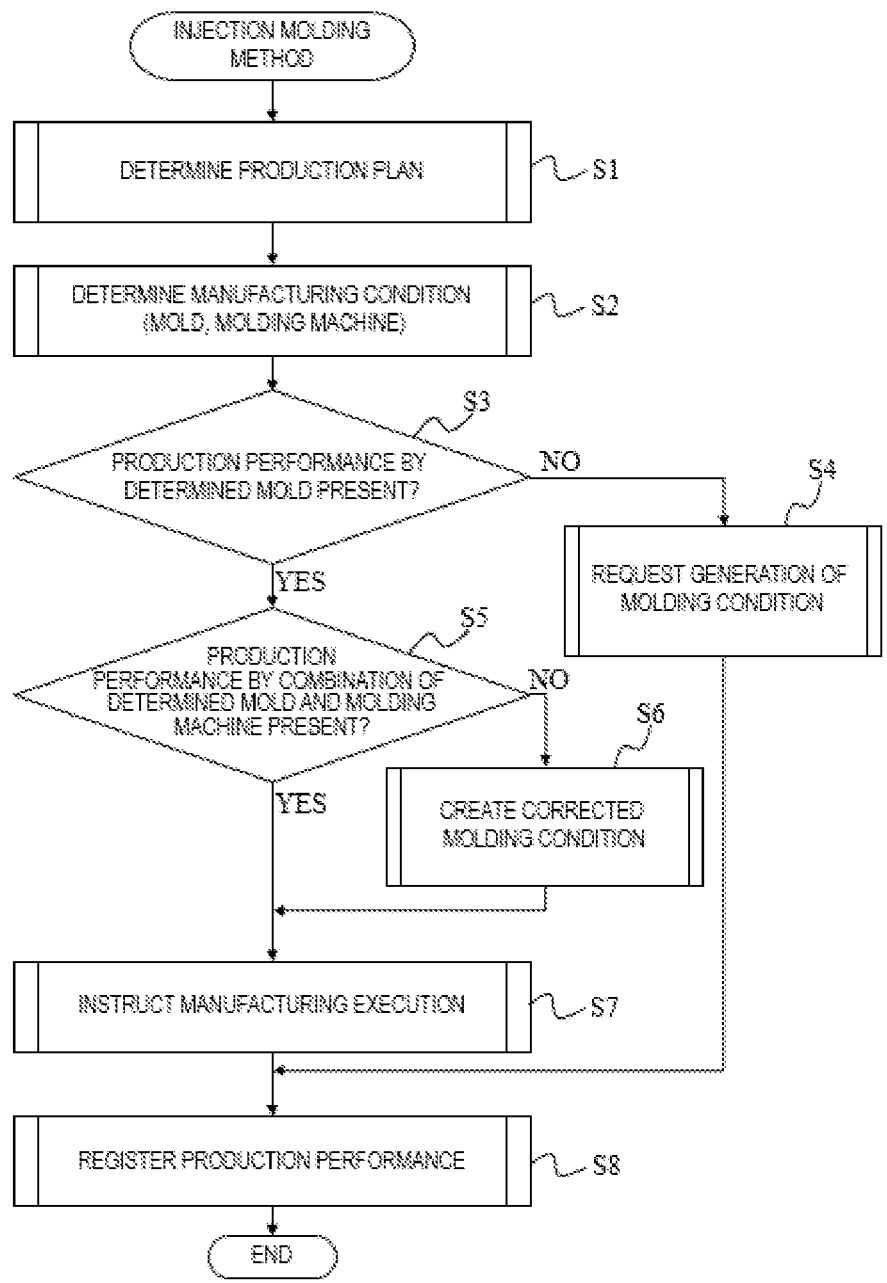
FIG. 4 is a flowchart showing an injection molding method.

FIG. 4 is a flowchart showing an example of an injection molding method performed by the injection molding system 1. In the figure, the injection molding machine is abbreviated as a molding machine. Further, in FIG. 4, the first mold is expressed as a determined mold and the first injection molding machine is expressed as a determined molding machine.

The production management system 2 acquires an order reception status, an inventory status, and the like, which are information for determining a production plan, from the production plan management unit 21 implemented by the GUI unit 70 (S1). For example, the user determines an optimum production specification, quantity, and period based on the order reception status and inventory status displayed on the GUI, and generates a production plan (S1). Alternatively, it is also possible to automatically generate a production plan by introducing a mathematical planning model and an algorithm for optimizing the entire logistic.

The manufacturing execution system 3 acquires the production plan and determines manufacturing conditions (S2) from the manufacturing condition determination unit 31 implemented by the GUI unit 70. For example, the user determines an optimum combination of the first injection molding machine and the first mold based on the production plan and an operation status of the injection molding machine in the manufacturing factory 6. Alternatively, the manufacturing conditions can be automatically determined by introducing a mathematical planning model and an algorithm for optimizing the production efficiency.

The production performance acquisition unit 33 refers to the production performance of the first mold determined in step S2, which is recorded in the production performance storage unit 32, and determines the presence or absence of the production performance (S3). When there is no production performance by the first mold (S3: NO), the production performance acquisition unit 33 outputs a molding condition issuing request to the manufacturing execution instruction unit 34 (S4). When there is the production performance by the first mold (S3: YES), the processing moves to step S5.

When the molding condition issuing request is input from the production performance acquisition unit 33, the manufacturing execution instruction unit 34 issues a molding condition issuing instruction to the manufacturing factory 6 (S4). For example, in the molding condition creation unit 52, the user confirms the molding condition issuing instruction from the manufacturing execution unit 51 implemented by the GUI unit 70. Then, the user derives the optimum molding condition for stably obtaining a good product by performing the injection molding process by the combination of the first injection molding machine and the first mold (S4). In step S4, theoretically optimum molding conditions are derived in advance by resin flow analysis, so that the number of repetitions (the number of trials and errors) of the injection molding process in issuing the molding condition can be reduced.

The production performance acquisition unit 33 refers to the production performance by the combination of the first injection molding machine and the first mold determined in step S2, which is recorded in the production performance storage unit 32, and determines the presence or absence of the production performance (S5). When there is a production performance by the combination of the first injection molding machine and the first mold (S5: YES), the production performance acquisition unit 33 outputs the acquired production performance to the manufacturing execution instruction unit 34 (S7). When there is no production performance by the combination of the first injection molding machine and the first mold (S5: NO), the production performance acquisition unit 33 instructs the corrected molding condition acquisition unit 35 to acquire the corrected molding condition (S5).

The corrected molding condition acquisition unit 35 inputs the first injection molding machine, the first mold, the second injection molding machine having a production performance by the combination of the first mold and the first injection molding machine, and the production performance by the combination of the second injection molding machine and the first mold, which are determined by the manufacturing condition determination unit 31, to the molding condition correction system 4, and causes the molding condition correction system 4 to create the corrected molding condition (S6). The corrected molding condition acquisition unit 35 outputs the created corrected molding condition to the manufacturing execution instruction unit 34 (S6).

The manufacturing execution system 3 outputs, from the manufacturing execution instruction unit 34 implemented by the GUI unit 70, a manufacturing execution instruction including the manufacturing condition determined in step S2 and the production performance input in step S5 or the corrected molding condition input in step S6, to the manufacturing factory 6 (S7).

For example, the user can confirm the determined manufacturing condition and the production performance or the corrected molding condition, and give a manufacturing execution instruction to the manufacturing factory 6 if there is no problem in content. Alternatively, it is possible to provide the molding condition in which the machine difference is corrected even if the user does not confirm the determined production performance or the content of the corrected molding condition.

The user confirms the content of the manufacturing execution instruction via the manufacturing execution unit 61 implemented by the GUI unit 70, and executes the injection molding process according to the combination of the instructed injection molding machine, mold, and molding condition (S7). When the molding condition can be input from the manufacturing execution instruction unit 34 to the specified injection molding machine via the communication device 16, the injection molding process is executed without the input of the molding condition to the injection molding machine by the user.

When the molding condition cannot be input from the manufacturing execution instruction unit 34 to the specified injection molding machine via the communication device 16, the user inputs the molding condition confirmed via the manufacturing execution instruction display unit 53 implemented by the GUI unit 70 to the setting screen 615 of the specified injection molding machine to execute the injection molding process.

When the molded article quality obtained by the injection molding process performed in step S4 or step S7 is good, the molded article quality inspection unit 63 registers, for example, the manufacturing conditions, the combination of the injection molding machine and the mold, the molding condition, and the inspection result of the molded article quality in the production performance learning unit 36 (S8). The GUI unit 70 can be used to register information in the production performance learning unit 36. Accordingly, when the same combination of the injection molding machine and the mold is determined as the manufacturing condition from the next time onward, the manufacturing can be performed based on the production performance stored in the production performance storage unit 32.

Figure 5:
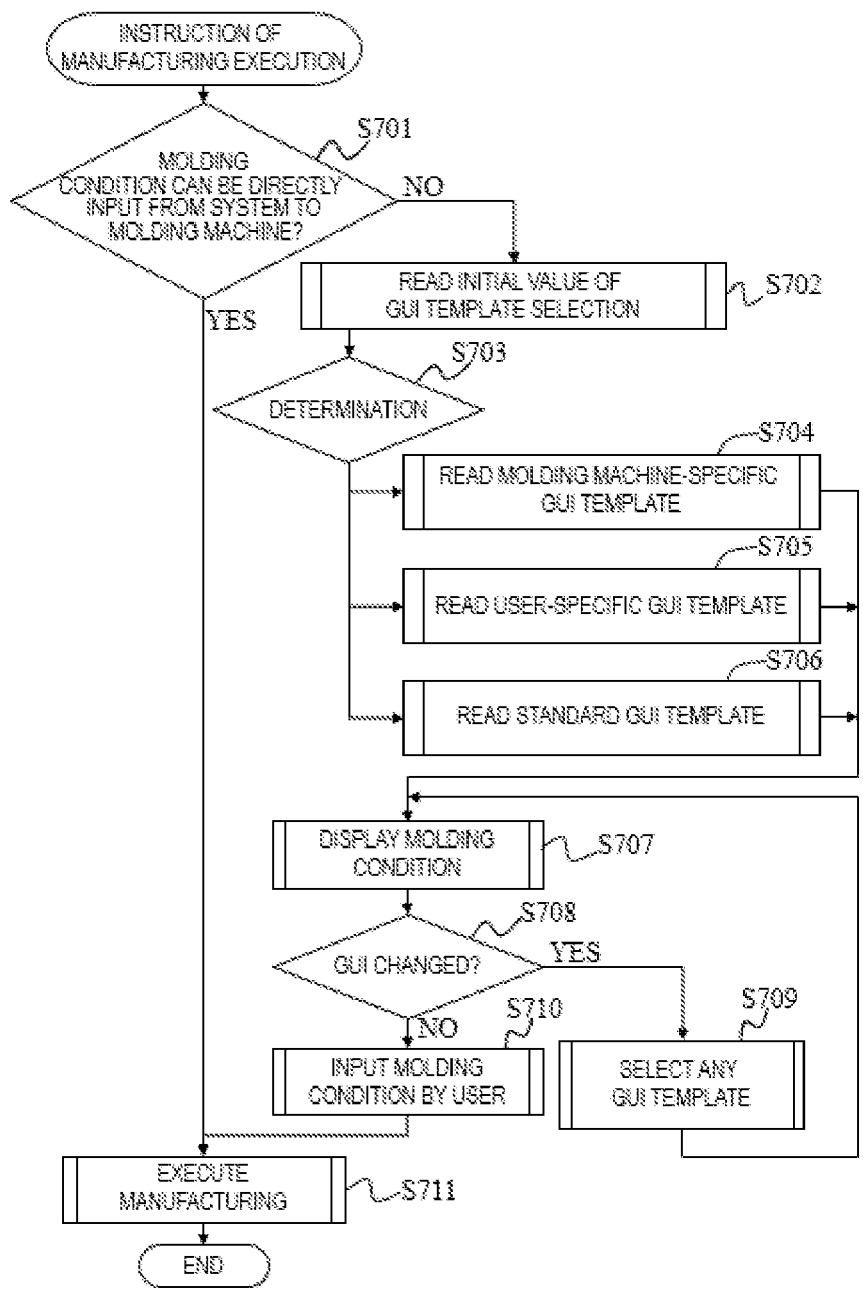
FIG. 5 is a flowchart showing a manufacturing execution instruction method.

FIG. 5 is a flowchart showing details from the manufacturing execution instruction to the execution of the injection molding process (S7 in FIG. 4) according to the present embodiment.

In the manufacturing execution system 3, the manufacturing execution instruction unit 34 implemented by the GUI unit 70 determines whether the molding condition can be directly input to the injection molding machine which is the "first injection molding machine" (S701). That is, the manufacturing execution system 3 determines whether the molding condition can be set from the manufacturing execution system 3 to the injection molding machine without the intervention of the user.

When the molding condition can be directly input from the manufacturing execution system 3 to the injection molding machine (S701: YES), the manufacturing execution instruction unit 34 outputs the content of the manufacturing execution instruction to the manufacturing execution unit 61 of the manufacturing factory 6 and causes the manufacturing execution unit 61 to execute the manufacturing (S711).

At this time, the manufacturing execution instruction unit 34 directly inputs the corrected molding condition or the production performance included in the content of the manufacturing execution instruction to the injection molding machine without the intervention of the user (S711). When the molding condition cannot be directly input from the manufacturing execution system 3 to the injection molding machine (S701: NO), the manufacturing execution instruction unit 34 causes the manufacturing execution support system 5 to display the content of the manufacturing execution instruction.

That is, in the manufacturing execution support system 5, the GUI template acquisition unit 51 implemented by the GUI unit 70 reads an initial value of GUI template selection (S702). Options of the initial value include, for example, "no selection", "molding machine-specific GUI template", and "user-specific GUI template".

When the molding machine-specific GUI template is initially selected, the GUI template acquisition unit 51 acquires the molding machine-specific GUI template associated with the injection molding machine. Therefore, the user does not need to search for and select the molding machine-specific GUI template associated with the injection molding machine (S702).

When the user-specific GUI template is initially selected, the GUI template acquisition unit 51 acquires the user-specific GUI template associated with the user. Therefore, the user does not need to search for and select a desired specific GUI template (S702). However, the user can change the user-specific GUI template associated with the user himself/herself in advance via the manufacturing execution instruction display unit 53.

The GUI template acquisition unit 51 determines the selection of the GUI template in step S702 or in step S709 described later (S703). When the GUI template is not initially selected, the GUI template acquisition unit 51 reads the standard GUI template stored in the GUI template storage unit 52 and outputs the standard GUI template to the manufacturing execution instruction display unit 53 implemented by the GUI unit 70 (S706).

When the initial selection of the GUI template is the molding machine-specific GUI template, the GUI template acquisition unit 51 refers to the GUI template storage unit 52, reads the molding machine-specific GUI template associated with the injection molding machine, and outputs the read GUI template to the manufacturing execution instruction unit 53 (S704).

When the initial selection of the GUI template is the user-specific GUI template, the GUI template acquisition unit 51 refers to the GUI template storage unit 52, reads the user-specific GUI template associated with the user, and outputs the user-specific GUI template to the manufacturing execution instruction unit 54 (S705).

The manufacturing execution instruction display unit 53 applies, to the molding condition, the GUI template input from the GUI template acquisition unit 51, and presents the molding condition input from the manufacturing execution instruction unit 34 to the user of the manufacturing factory 6 via the GUI unit 70 (S707).

The manufacturing execution instruction display unit 53 receives a change of the GUI template from the user (S708). After confirming the molding condition presented from the manufacturing execution instruction display unit 53, the user can request to change the GUI template (S708). When the change of the GUI template is requested by the user (S708: YES), the manufacturing execution instruction display unit 53 presents a plurality of GUI templates prepared in advance via the GUI unit 70, and waits for the user to select the GUI template (S709).

The manufacturing execution instruction display unit 53 acquires the GUI template selected by the user from the GUI template acquisition unit 51, and returns to step S707 (S709). When the user does not change the GUI template presented from the manufacturing execution instruction display unit 53 (S708: NO), the user inputs the molding condition to the injection molding machine in accordance with the display of the GUI template (S710).

After inputting the molding condition to the injection molding machine (S710), the user of the manufacturing factory confirms the content of the manufacturing execution instruction, and executes the injection molding process in accordance with the combination of the instructed injection molding machine, the mold, and the molding condition (S711).

Figure 6:
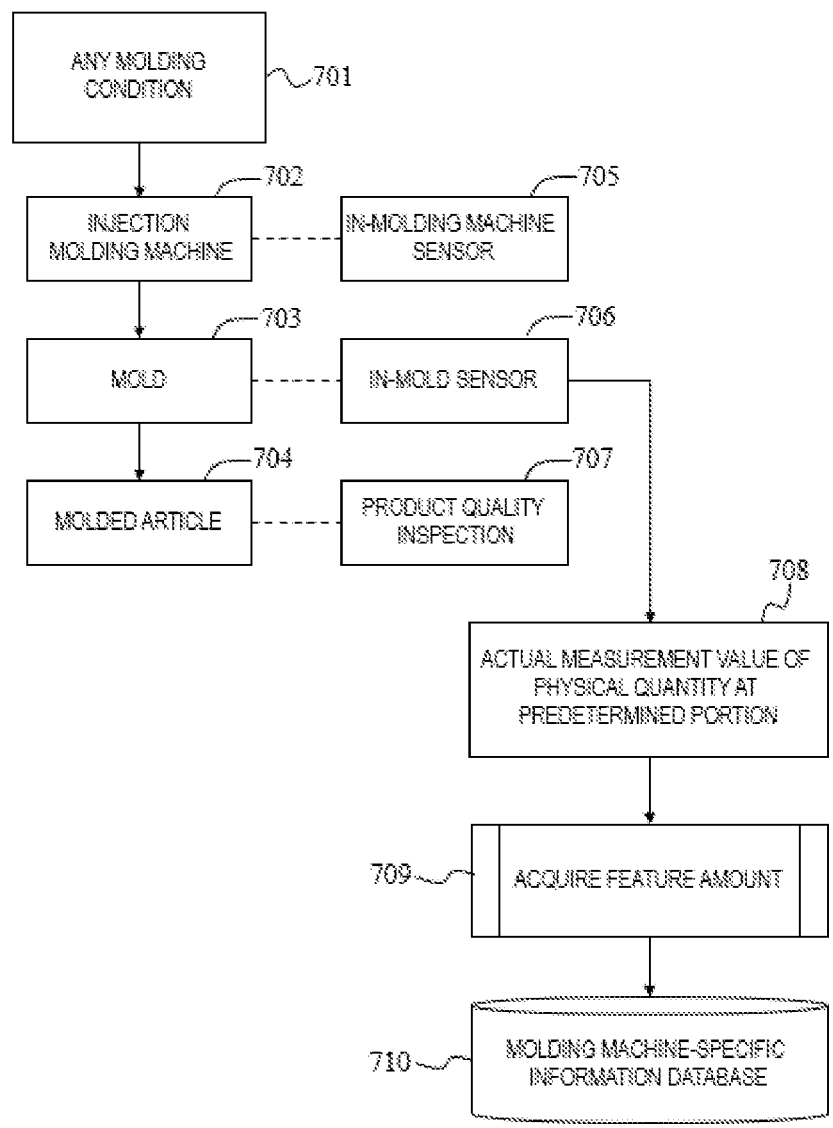
FIG. 6 is a block diagram showing a method of acquiring molding machine-specific information.

FIG. 6 is a block diagram showing an example of a method of acquiring the molding machine-specific information of the injection molding machine. The method of acquiring the molding machine-specific information shown in FIG. 6 can be implemented by using a "sensor-attached mold" or a "sensor-equipped mold" in which a sensor for measuring a predetermined physical quantity is provided at a predetermined position.

First, any molding condition 701 is input to an actual injection molding machine 702 to acquire a physical quantity at a predetermined portion in a mold. Here, the injection molding machine 702 corresponds to the injection molding machine 60 described with reference to FIG. 3.

The molding condition 701 does not need to be a single condition, and may be a plurality of conditions. The physical quantity can be acquired under various molding conditions within a range in which a good product can be obtained as the molded article quality.

Since the machine difference of the injection molding machine may vary depending on the setting value of the resin temperature or the pressure holding, even if the machine difference is acquired under a single molding condition, the machine difference may not be effective. The molding condition 701 is preferably a condition for completing the pressure holding after gate sealing. This is because when the pressure holding time is insufficient and the pressure holding is completed before the gate sealing is performed, the resin flows back from the gate portion, and filling density of the molded article may decrease. In this case, it is difficult to evaluate the correlation with the molded article quality.

In order to acquire an actual molding phenomenon in the injection molding machine 702, there is a method of using an in-molding machine sensor 705 or an in-mold sensor 706. An example of the in-molding machine sensor 705 is the load cell 610 shown in FIG. 3.

When using the in-molding machine sensor 705, for example, an air shot of injecting without mounting the mold 703 is performed, and the pressure loss by the injection mechanism is indirectly measured by observing the output of the load cell 610 at that time. Alternatively, a sensor is installed on the nozzle portion, and the state of the resin is measured a little before the resin flows into the mold. When measuring the resin temperature, the temperature of the resin obtained by the air shot may be directly measured by a thermometer or the like.

When using the in-mold sensor 706, by disposing the sensor at any position in the mold 703, the molding phenomenon in the mold 703 can be directly measured, and an actual measurement value 708 of the physical quantity can be acquired. The quality of a molded article 704 can be acquired by product quality inspection 707.

A feature amount is acquired from the obtained physical quantity (709). Since all of the obtained physical quantities are acquired as a time change during the injection molding process, it is difficult to directly evaluate the physical quantities. Therefore, in the present embodiment, it is possible to quantitatively evaluate the machine difference of the injection molding machine 702 by acquiring the feature amount that may influence the molded article quality based on the time change of the physical quantity.

In the present embodiment, the obtained feature amount and any molding condition input first are recorded in a molding machine-specific information database 710 in association with each other. The molding machine-specific information database 710 corresponds to the molding machine-specific information storage unit 41 in FIG. 1.

According to the present embodiment constituted as described above, since the molding condition can be displayed in any GUI template in accordance with the environment of the user, the molding condition can be input to the injection molding machine in a short time without depending on the skill of the user.

In the present embodiment, for example, the molding condition can be presented to the user by using a molding machine-specific GUI template similar to the GUI of the setting screen 615 of the injection molding machine. Therefore, the user can input the molding condition to the injection molding machine in a short time even if the user is not familiar with the specification of the injection molding machine to be operated.

In the present embodiment, since the molding condition can be presented to the user with the user-specific GUI template familiar to the user, the user can input the molding condition to the injection molding machine in a short time without overlooking an item to be input.

Further, according to the present embodiment, when molding is performed by another injection molding machine using a mold having a production performance by a certain injection molding machine, it is possible to obtain an optimum injection molding condition for obtaining a good product in a shorter time than before, based on the production performance for obtaining the good product and the molding machine-specific information acquired in advance, without depending on a skilled operator.

Further, according to the present embodiment, when optimizing a production schedule as the manufacturing condition, it is not necessary to consider a skill level of the user who operates the injection molding machine, and it is not necessary to consider the combination of the injection molding machine and the mold, so that it is possible to make a more efficient production schedule.

Furthermore, according to the present embodiment, it is possible to share the molding machine-specific GUI template or the user-specific GUI template created by a large number of users. Therefore, as the number of users who use the system 1 according to the present embodiment increases, the GUI templates created by other users can be used. Therefore, the number of man-hours for creating the GUI template can be remarkably reduced.

Furthermore, according to the present embodiment, the molding machine-specific information acquired by a large number of users can be shared. Therefore, as the number of users increases, the number of cases where the corrected molding condition can be acquired using the molding machine-specific information acquired by another user increases. Therefore, the number of man-hours for acquiring the molding machine-specific information can be reduced.

Second Embodiment

Figure 7:
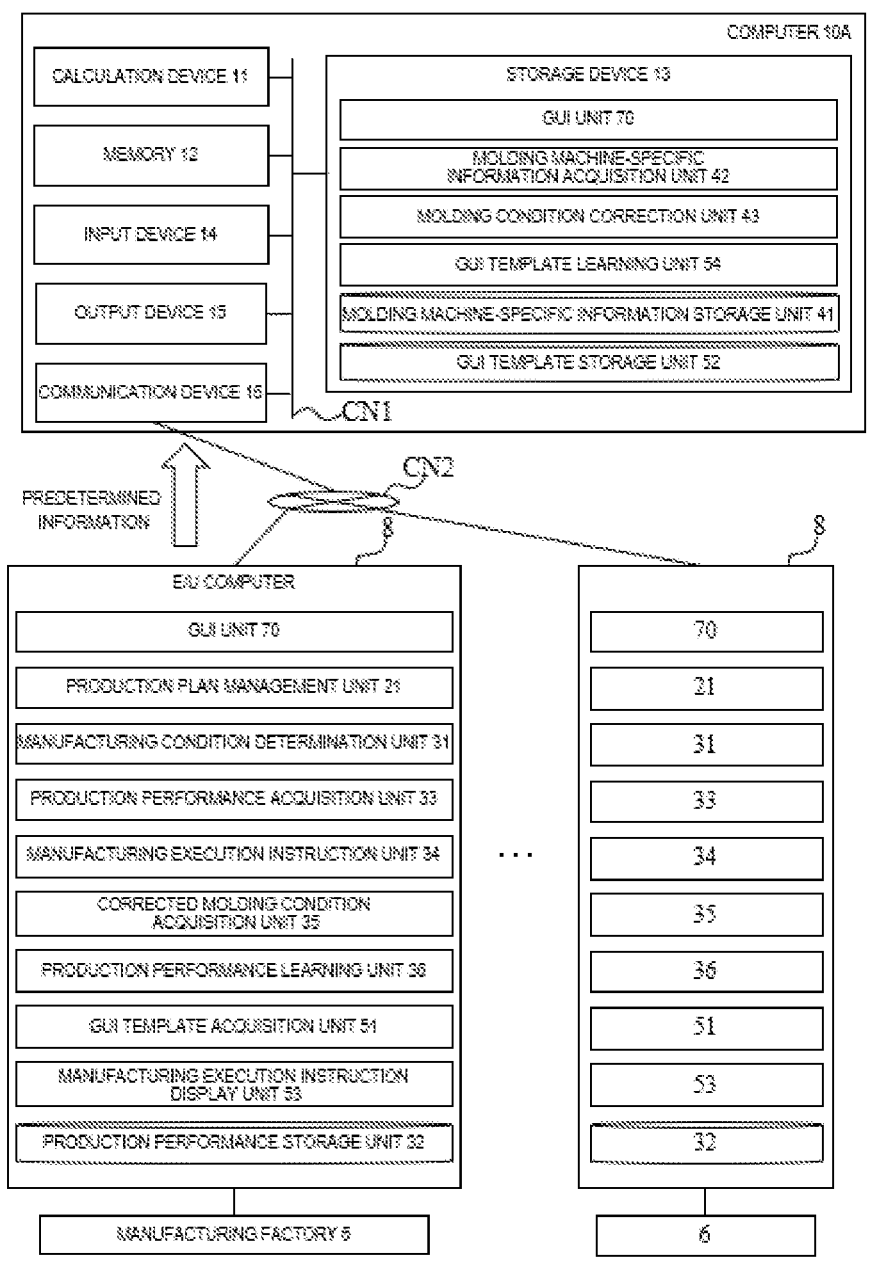
FIG. 7 is an explanatory diagram showing a computer configuration of an injection molding system according to a second embodiment.

A second embodiment will be described with reference to FIG. 7. In the following embodiments including the present embodiment, differences from the first embodiment will be mainly described. In the present embodiment, a part of the functions of the molding condition correction system 4 and the manufacturing execution support system 5 of the injection molding system 1 are provided in a computer 10A on a network CN2. The computer 10A is provided with the GUI template storage unit 52 and the GUI template learning unit 54 in the manufacturing execution support system 5. A part of the functions of the production management system 2, the manufacturing execution system 3, and the manufacturing execution support system 5 are managed by a computer 8 on a user (E/U) side having the manufacturing factory 6. In the computer 8, the GUI template acquisition unit 51 and the manufacturing execution instruction display unit 53 are provided in the manufacturing execution support system 5.

The computer 8 on a factory side can acquire and register a GUI template by transmitting predetermined information to the computer 10A in which the GUI template storage unit 52 and the GUI template learning unit 54 are mounted. As described above, the predetermined information is, for example, a GUI template selected by the user or a GUI template created by the user.

The computer 8 on the factory side can obtain the corrected molding condition by transmitting the predetermined information to the computer 10A in which the molding condition correction system 4 is mounted. As described above, the predetermined information is, for example, information including the capacity of the first mold and the runner configuration of the first mold. Further, for example, a control mode (proportional-integral-differential (PID), setting value, and the like) of the first injection molding machine, computer aided design (CAD) data of the first mold, and specification data and setting data of the first injection molding machine may also be adopted as the predetermined information. The computer 8 on the factory side is an example of a "predetermined computer". The computer 10A is an example of "another predetermined computer".

The present embodiment constituted in this manner also achieves the same operational effect as that of the first embodiment. Furthermore, according to the present embodiment, computers 8 of a plurality of users can jointly use the GUI template storage unit 52 provided by the computer 10A. Therefore, in the present embodiment, the injection molding machine-specific GUI template can be provided to each of the injection molding machines of the plurality of factories by one GUI template storage unit 52.

In the present embodiment, it is possible to provide GUI templates of user-specific GUIs respectively provided in the plurality of factories in the same manner. Accordingly, for example, by another user referring to the user-specific template created by a skilled user, it is possible to input the molding condition in a short time without overlooking items input by the plurality of users.

Furthermore, according to the present embodiment, the computers 8 of the plurality of users can jointly use the molding condition correction system 4 provided by the computer 10A. Therefore, in the present embodiment, one molding condition correction system 4 can provide a corrected molding condition to each injection molding machine of the plurality of factories.

Third Embodiment

Figure 8:
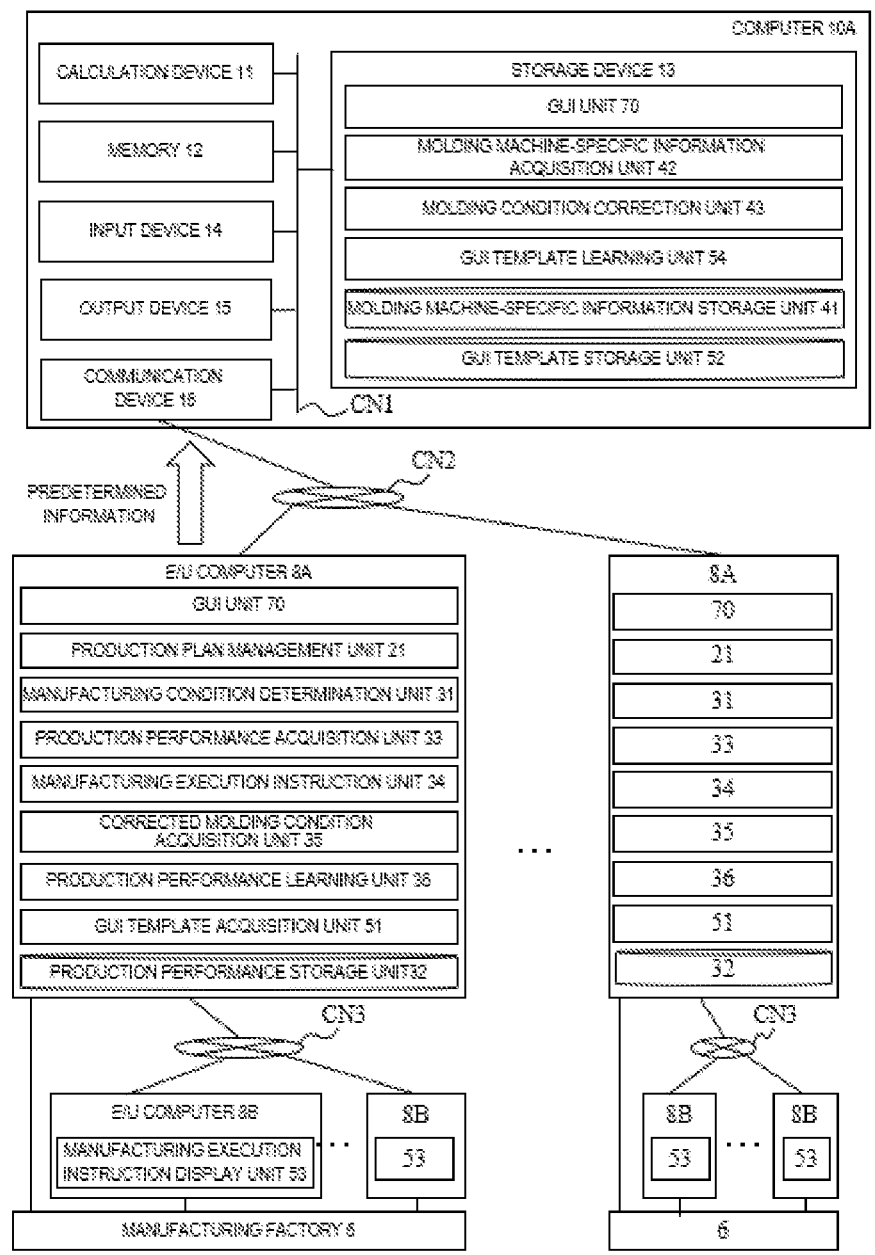
FIG. 8 is an explanatory diagram showing a computer configuration of an injection molding system according to a third embodiment.

A third embodiment will be described with reference to FIG. 8. In the following embodiments including the embodiment, differences from the second embodiment will be mainly described. The present embodiment is applied to, for example, a case where a plurality of users are present in the manufacturing factory 6. In the present embodiment, the production management system 2, the manufacturing execution system 3, and the GUI template acquisition unit 51 of the manufacturing execution support system 5 are managed by one computer 8A shared by users (E/U) having the manufacturing factory 6 on a network CN3. Functions of the manufacturing execution instruction display unit 53 of the manufacturing execution support system 5 are managed by a computer 8B owned by each of the plurality of users (E/U) of the manufacturing factory 6.

The computer 8B owned by each of the plurality of users acquires any GUI template from the computer 8A in which the GUI template acquisition unit 51 is mounted, and can thereby display the molding condition to which any GUI template is applied. The computer 8A is an example of a "predetermined computer". The computer 8B is an example of "another predetermined computer".

The present embodiment constituted as described above also achieves the same operational effects as those of the first embodiment and the second embodiment. Furthermore, according to the present embodiment, computers 8B owned by a plurality of users belonging to a plurality of manufacturing factories 6 can jointly use the GUI template storage unit 52 provided by the computer 10A. Therefore, in the present embodiment, it is possible to display a molding condition to which any GUI template is applied to the computer 8B owned by each of the plurality of users.

Fourth Embodiment

Figure 9:
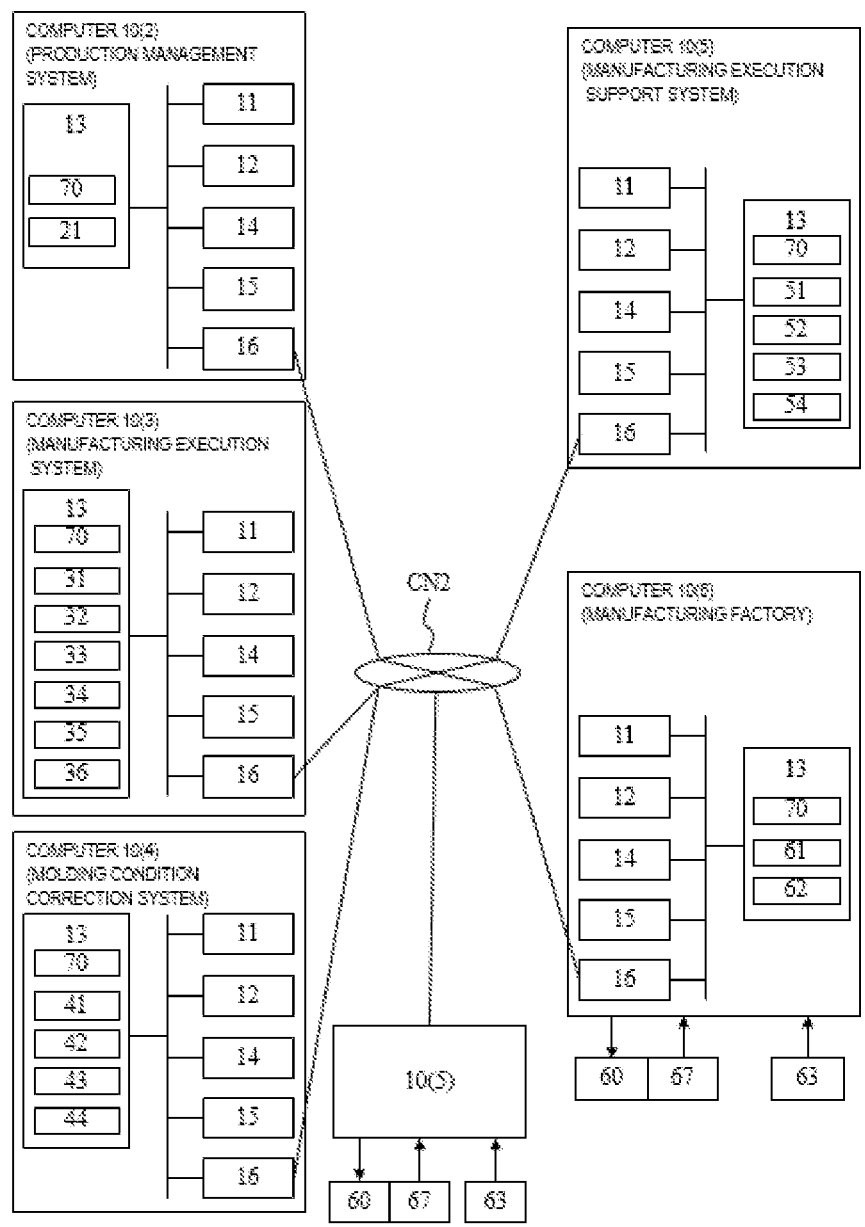
FIG. 9 is an explanatory diagram showing a computer configuration of an injection molding system according to a fourth embodiment.

A fourth embodiment will be described with reference to FIG. 9. In the present embodiment, the production management system 2, the manufacturing execution system 3, the molding condition correction system 4, the manufacturing execution support system 5, and the manufacturing factory 6 described with reference to FIG. 1 are implemented by computers 10(2), 10(3), 10(4), 10(5), and 10(6), respectively, and are connected via a communication network CN2.

The present embodiment constituted in this manner also achieves the same operational effect as that of the first embodiment. Further, in the present embodiment, since the computers 10(2) to 10(6) are assigned to systems 2 to 6, for example, computers 10(6) of a plurality of manufacturing factories to be distributed can be managed using a common production management system 2, manufacturing execution system 3, molding condition correction system 4, and manufacturing execution support system 5.

Fifth Embodiment

Figure 10:
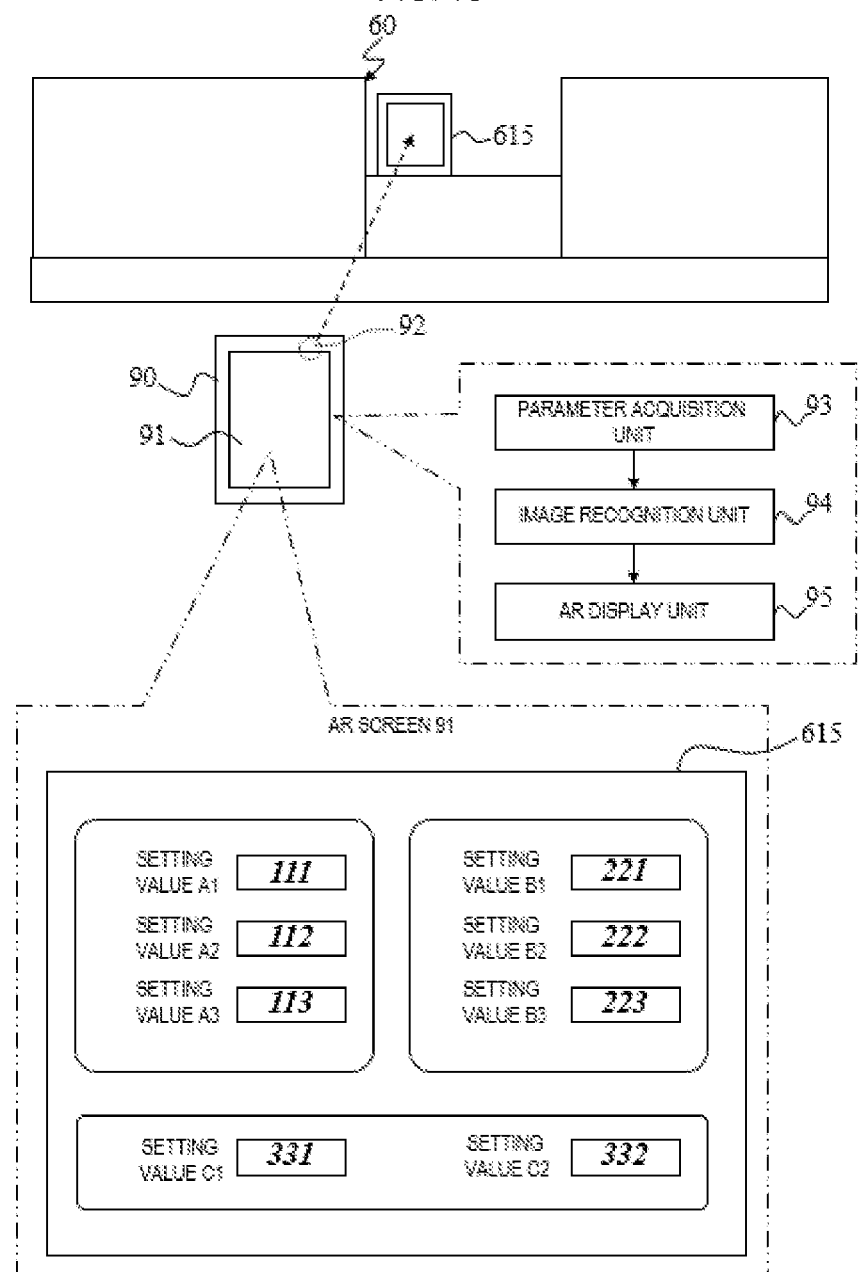
FIG. 10 is an explanatory diagram of an injection molding system according to a fifth embodiment.

A fifth embodiment will be described with reference to FIG. 10. In the present embodiment, so-called augmented reality (AR) is used. That is, the GUI of the setting screen 615 of the injection molding machine 60 is captured by a camera 92 built in a terminal 90 held by a user, and parameters of molding conditions are displayed on the captured GUI of the setting screen 615 in an overlapping manner on a screen of the terminal 90.

As shown on the right side of the terminal 90 of the user, the terminal 90 has functions of a parameter acquisition unit 93, an image recognition unit 94, and an AR display unit 95.

The parameter acquisition unit 93 acquires each parameter of the molding condition from the manufacturing execution instruction display unit 53. The image recognition unit 94 performs image analysis on the GUI of the captured setting screen 615, and detects a region to which each parameter is to be input. The AR display unit 95 displays the parameters acquired by the parameter acquisition unit 93 so as to be overlapped on an input region detected by the image recognition unit 94.

The present embodiment constituted as described above also achieves the same operational effects as those of the first to fourth embodiments. Further, according to the present embodiment, by displaying the setting screen 615 of the injection molding machine 60 on the terminal 90 of the user, it is possible to indicate the input position of each parameter of the molding condition on the screen.

Sixth Embodiment

A sixth embodiment will be described with reference to FIG. 11. In the present embodiment, a molding condition display region 91G for displaying the molding condition and a setting screen GUI display region 615G for displaying a still image obtained by capturing the GUI of the setting screen 615 of the injection molding machine are displayed on a screen 91 of the terminal 90 held by the user.

In the drawing, the molding condition display region 91G is displayed on an upper side of the screen 91, and a setting screen GUI display region 615G is displayed on a lower side of the screen 91. However, the disposition position of the molding condition display region 91G and the setting screen GUI display region 615G may be upside down, or the two may be disposed at left and right.

Then, an arrow indicating a correspondence relationship between the molding condition display region 91G and the setting screen GUI display region 615G is displayed on the screen 91. That is, an arrow indicates to the user where a value of each parameter of the molding condition should be input in the GUI of the setting screen indicated by the still image. An arrow may be displayed in units of a group of parameters. Accordingly, the number of arrows displayed on the screen 91 can be reduced such that the user can easily view the screen 91. The present embodiment constituted as described above also achieves the same operational effects as those of the first to fourth embodiments.

FIGS. 12 to 14 show examples of GUI templates provided to the user of the injection molding machine by the present system 1.

FIG. 12 shows an example of a molding machine-specific GUI template G1. The molding machine-specific GUI template G1 displays parameters for each group such as "temperature" GP11, "plasticization" GP12, and "mold opening and closing" GP13.

The "temperature" GP11 includes, for example, a temperature of the molding machine, an actually measured resin temperature, a set temperature of the mold, and an actually measured temperature of the mold. The "plasticization" GP12 includes, for example, a parameter group related to filling, a parameter group related to pressure holding, and a parameter group related to resin measurement. The "mold opening and closing" GP13 includes, for example, a parameter group related to opening and closing of the mold, such as a mold clamping force.

FIG. 13 shows an example of a user-specific GUI template G2. The user-specific GUI template G2 displays parameters for each group such as "molding temperature" GP21, "stage number" GP22, "speed" GP23, "pressure" GP24, "time" GP25, "switching position" GP26, and "measurement" GP27.

FIG. 14 shows an example of a standard GUI template G3. The standard GUI template G3 displays parameters for each group such as "temperature" GP31, "measurement" GP32, "injection" GP33, "pressure holding" GP34, and "others" GP35.

As shown in FIGS. 12 to 14, the GUI templates G1 to G3 have different configurations.

The invention is not limited to the above embodiments, and includes various modifications. For example, the embodiments described above have been described in detail for easy understanding of the invention, and the invention is not necessarily limited to those including all of the configurations described above. Further, part of the configuration of one embodiment can be replaced with the configuration of another embodiment, or the configuration of one embodiment can be added with the configuration of another embodiment. In addition, a part of the configuration of each embodiment may be added, deleted, or replaced with another configuration. Furthermore, the combination of characteristics disclosed in the present embodiment is not limited to the description of the scope of claims. For example, the production performance storage unit 33 may be the storage device storing the production performances. And format of the storage device for storing the production performance may be database, or filesystem. This example may be apply to other component, which is shown in FIGS. 1, 7, 8, and other figures, has a shape of cylinder.

What is claimed is:

1. An injection molding system comprising:
one or more computers each including a processor and a storage device, wherein
the processor
determines a combination of a mold and an injection molding machine and a specific molding condition specific to the combination of the mold and the injection molding machine, and outputs the determined specific molding condition in a predetermined form for manual input to the injection molding machine, and the predetermined form includes a user-specific graphical user interface for a specific user among a plurality of users of the injection molding machine.

2. The injection molding system according to claim 1, wherein
the predetermined form corresponds to a configuration of a setting screen associated with the injection molding machine.

3. The injection molding system according to claim 2, wherein
the predetermined form is generated based on screen configuration information corresponding to the setting screen and the specific molding condition.

4. The injection molding system according to claim 2, wherein
the predetermined form corresponds to the configuration of the setting screen associated with the injection molding machine for manually inputting each setting parameter included in the specific molding condition.

5. The injection molding system according to claim 1, wherein
the predetermined form includes a first predetermined form associated with a configuration of a setting screen associated with the injection molding machine and a second predetermined form including the user-specific graphical user interface.

6. The injection molding system according to claim 5, wherein
the predetermined form further includes a third predetermined form which is a standard form independent of the injection molding machine and the specific user.

7. The injection molding system according to claim 1, wherein when the determining the specific molding condition, the processor
confirms presence or absence of a first production performance using a combination of a first mold and a first injection molding machine by searching production performances stored in the storage device,
when the first production performance exists, setting the first production performance as the specific molding condition, and
when the first production performance does not exist, creating a corrected molding condition for injection molding using the combination of the first injection molding machine and the first mold and determines the created corrected molding condition as the specific molding condition, based on
first molding machine-specific information acquired in advance for the first injection molding machine,
second molding machine-specific information acquired in advance for a second injection molding machine having a second production performance, which is combined with the first mold, and
the second production performance acquired from the production performances stored in the storage device.

8. The injection molding system according to claim 7, wherein
the processor registers a quality inspection result of a product injection-molded by the second injection molding machine according to the corrected molding condition in the production performance stored in the storage device.

9. The injection molding system according to claim 8, wherein
molding machine-specific information includes information in which an actual measurement value of a physical quantity in a predetermined portion in a mold attached to an injection molding machine and any molding condition are associated with each other when the any molding condition is input to the injection molding machine and injection molding is performed.

10. The injection molding system according to claim 7, wherein when the determining the specific molding condition, the processor
acquires predetermined information on the first mold and the first injection molding machine, and
when the first production performance does not exist, creates the corrected molding condition based on the first molding machine-specific information, the second molding machine-specific information, the second production performance, and the predetermined information.

11. A setting support method for supporting setting of a molding condition in an injection molding machine using a computer, wherein
the computer
determines a combination of a mold and an injection molding machine and a specific molding condition specific to the combination of the mold and the injection molding machine, and
outputs, to a terminal associated with a user of the injection molding machine, the determined specific molding condition in a predetermined form for manual input to the injection molding machine, and
the predetermined form includes a user-specific graphical user interface for a specific user among a plurality of users of the injection molding machine.

* * * * *